(12) United States Patent
Rogers

(10) Patent No.: US 11,400,582 B2
(45) Date of Patent: Aug. 2, 2022

(54) ROBOTIC HANDLING APPARATUS, LINK MECHANISM, AND ROBOTIC HANDLING SYSTEM

(71) Applicant: YASKAWA AMERICA, INC., Waukegan, IL (US)

(72) Inventor: John Charles Rogers, Danville, CA (US)

(73) Assignee: YASKAWA AMERICA, INC., Waukegan, IL (US)

( * ) Notice: Subject to any disclaimer, the term of this patent is extended or adjusted under 35 U.S.C. 154(b) by 689 days.

(21) Appl. No.: 16/191,365

(22) Filed: Nov. 14, 2018

(65) Prior Publication Data

US 2019/0299397 A1    Oct. 3, 2019

Related U.S. Application Data

(60) Provisional application No. 62/648,590, filed on Mar. 27, 2018.

(51) Int. Cl.
*B25J 18/00* (2006.01)
*B65G 47/90* (2006.01)
*B25J 9/00* (2006.01)
*B25J 17/02* (2006.01)

(52) U.S. Cl.
CPC .......... *B25J 9/0009* (2013.01); *B25J 17/025* (2013.01); *B25J 18/00* (2013.01); *B65G 47/90* (2013.01)

(58) Field of Classification Search
CPC ........ B25J 9/0009; B25J 9/0087; B25J 9/009; B25J 11/0095; B25J 17/025; B25J 18/00; B65G 47/90; Y10S 901/15; Y10S 901/17; Y10S 901/31; Y10S 901/39

See application file for complete search history.

(56) References Cited

U.S. PATENT DOCUMENTS

| | | | |
|---|---|---|---|
| 8,287,015 B2 * | 10/2012 | Hawes | B65G 47/90 294/86.4 |
| 8,833,827 B2 * | 9/2014 | Ciocarlie | B25J 9/1075 294/111 |
| 8,973,958 B2 * | 3/2015 | Allen Demers | B25J 15/022 294/106 |
| 9,149,928 B2 * | 10/2015 | Yamaguchi | B25J 15/08 |
| 9,266,284 B2 * | 2/2016 | Lu | B29C 66/863 |
| 9,279,143 B2 * | 3/2016 | Umeno | B25J 15/0033 |
| 9,486,927 B1 * | 11/2016 | Morey | B25J 15/10 |

(Continued)

FOREIGN PATENT DOCUMENTS

JP       5274053 B2  *  8/2013
JP     2018058080 A  *  4/2018

*Primary Examiner* — Bobby Rushing, Jr.
(74) *Attorney, Agent, or Firm* — Mori & Ward, LLP

(57) ABSTRACT

A robotic handling apparatus includes a first arm member configured to pivot about a first pivot axis and a first drive unit configured to bring the first arm member into motion about the first pivot axis. A second arm member is configured to pivot about a second pivot axis, the second arm member being connected to the first arm member and having a distal end portion. A second drive unit is configured to bring the second arm member into motion about the second pivot axis. A third arm member is configured to pivot about a third pivot axis. A carrier unit is connected to the distal end portion of the second arm member and the distal end of the third arm member to define a distance.

20 Claims, 15 Drawing Sheets

(56) References Cited

U.S. PATENT DOCUMENTS

| | | | | |
|---|---|---|---|---|
| 9,782,902 B1* | 10/2017 | Kim | ................. | B25J 15/0009 |
| 2005/0178641 A1* | 8/2005 | Yoshida | ............. | B23Q 7/043 |
| | | | | 198/468.4 |
| 2005/0234327 A1* | 10/2005 | Saracen | ............. | A61B 6/548 |
| | | | | 600/407 |
| 2014/0067115 A1* | 3/2014 | Minami | ............. | B25J 9/0087 |
| | | | | 700/245 |
| 2015/0104283 A1* | 4/2015 | Nogami | ................. | B25J 9/06 |
| | | | | 414/730 |
| 2015/0246446 A1* | 9/2015 | Casanelles Moix | ...................... | |
| | | | | B25J 15/0052 |
| | | | | 414/226.01 |
| 2015/0251781 A1* | 9/2015 | Matsukuma | ........ | B25J 9/0087 |
| | | | | 141/2 |
| 2017/0239705 A1* | 8/2017 | Takeda | ............. | B21D 43/105 |
| 2018/0079541 A1* | 3/2018 | Wintergerst | ......... | B65B 65/02 |

\* cited by examiner

ROBOTIC HANDLING APPARATUS, LINK MECHANISM, AND ROBOTIC HANDLING SYSTEM

CROSS-REFERENCE TO RELATED APPLICATION

The present application claims priority under 35 U.S.C. § 119(e) to U.S. provisional Application No. 62/648,590, filed on Mar. 27, 2018, the entire contents of which are herein incorporated by reference.

BACKGROUND OF THE INVENTION

Field of the Invention

The present invention relates to a link mechanism, robotic handling apparatus and robotic handling system. The robotic handling apparatus, link mechanism, and robotic handling system provide a wide range of motion in which an orientation of a carrier unit is controllable.

Discussion of the Background

In recent years, robots have been utilized in manufacturing and other applications in which automation is desirable. In recent years, robots have been designed for increasingly diverse applications including picking, assembly, and sorting. One aspect of robotic automation that is of particular interest are robots for article transportation.

SUMMARY OF THE INVENTION

The present invention advantageously provides a robotic handling apparatus that includes a first arm member configured to pivot about a first pivot axis, a first drive unit configured to bring the first arm member into motion, and a second arm member configured to pivot about a second pivot axis. The second arm member is connected to the first arm member and has a distal end portion. The robotic handling apparatus includes a third arm member configured to pivot about a third pivot axis, the third arm member having a distal end portion, and a carrier unit connected to the distal end portion of the second arm member and the distal end portion of the third arm member to define a distance between the distal end portion of the second arm member and the distal end portion of the third arm member.

The present invention advantageously provides a link mechanism for a robotic handling apparatus, the link mechanism including a first arm member configured to pivot about a first pivot axis, and a second arm member configured to pivot about a second pivot axis, the second arm member being connected to the first arm member and having a distal end portion. The link mechanism includes a third arm member configured to pivot about a third pivot axis, the third arm member having a distal end portion, and a carrier unit connected to the distal end portion of the second arm member and the distal end of the third arm member to define a distance between the distal end portion of the second arm member and the distal end portion of the third arm member.

The present invention advantageously provides a robotic handling system including a robotic handling apparatus including: a first arm member configured to pivot about a first pivot axis, a first drive unit configured to bring the first arm member into motion, and a second arm member configured to pivot about a second pivot axis, the second arm member being connected to the first arm member and having a distal end portion. The robotic handling apparatus includes a third arm member configured to pivot about a third pivot axis, the third arm member having a distal end portion, and a carrier unit connected to the distal end portion of the second arm member and the distal end portion of the third arm member to define a distance between the distal end portion of the second arm member and the distal end portion of the third arm member. The robotic handling system includes a controller configured to control the robotic handling apparatus and to cause the distance to change.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EXEMPLARY EMBODIMENTS OF THE INVENTION

Figure 1:
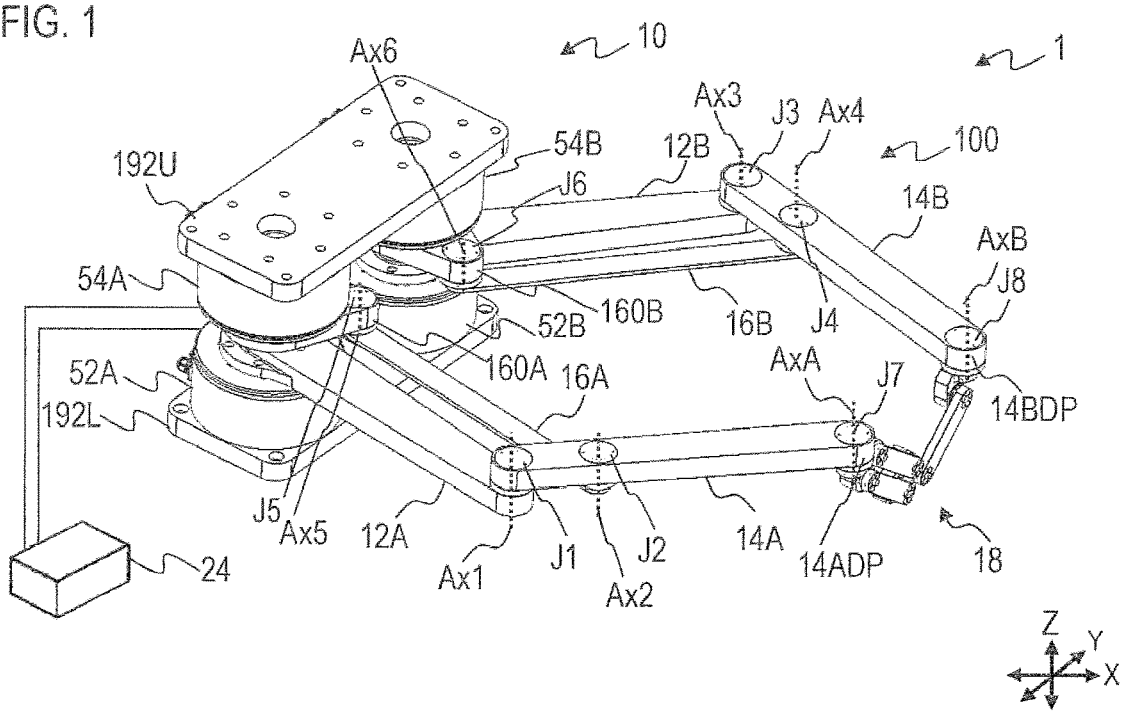
FIG. 1 is a perspective view of a robotic apparatus according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

In each of the Figures provided herein, an exemplary vertical direction is denoted by Z, while exemplary horizontal directions are represented by a horizontal (length) direction X and a horizontal (width) direction Y. Features identified with reference characters concluding with "A" have the same or substantially the same structure as the features identified with corresponding reference characters that conclude with "B." However, such corresponding features can also have different structures if necessary.

FIG. 1 is a perspective view of a robotic handling system 1 including a robotic handling apparatus 10 and a controller 24 according to an embodiment. As depicted in FIG. 1, robotic apparatus 10 includes first lower drive housing 52A, first upper drive housing 54A, second lower drive housing 52B, and second upper drive housing 54B. The first and second lower drive housings 52A and 52B are fixedly connected to a lower base plate 192L. The first and second upper drive housings 54A and 54B are fixedly connected to an upper base plate 192U. Arm linkage 100 extends from drive housings 52A, 52B, 54A, and 54B.

Arm linkage 100 (link mechanism) includes six arms (arm members) 12A, 12B, 14A, 14B, 16A, and 16B, first and second crank arms 160A and 160B, and a carrier unit 18 for supporting an end effector. First arm (first arm member) 12A has a proximal end portion rotatably connected to a first lower drive housing 52A. A distal end portion of first arm 12A is connected to a proximal end portion of second arm (second arm member) 14A via joint J1 such that second arm 14A is pivotable about axis Ax1 (second pivot axis).

A fourth arm (fourth arm member) 12B has a proximal end portion rotatably connected to a second lower drive housing 52B. A distal end portion of fourth arm 12B is connected to a proximal end portion of third arm (third arm member) 14B via joint J3 such that the third arm 14B is pivotable about axis Ax3 (third pivot axis).

First crank arm 160A has a proximal end portion that is rotatably connected to a first upper drive housing 54A. A distal end portion of crank arm 160A is connected to a proximal end portion of first carrier arm (carrier arm member) 16A via joint J5 that provides pivotal motion of first carrier arm 16A with respect to crank arm 160A about axis Ax5. The first carrier arm 16A is pivotally connected to second arm 14A via a joint J2 that allows second arm 14A to pivot about axis Ax1. Joint J2 is disposed between the proximal end portion of second arm 14A and a distal end portion of second arm 14A. Preferably, joint J2 is closer to the proximal end portion of second arm 14A than the distal end portion of second arm 14A.

Second crank arm 160B has a proximal end portion that is rotatably connected to a second upper drive housing 54B. A distal end portion of crank arm 160B is rotatably connected to a proximal end portion of second carrier arm (carrier arm member) 16B via joint J6 that provides pivotal motion about axis Ax6. The second carrier arm 16B is pivotally connected to third arm 14B via a joint J4 that provides pivotal motion about axis Ax4. Joint J4 is disposed between the proximal end portion of third arm 14B and a distal end portion of third arm 14B.

A carrier unit 18 is connected to the distal end portion 14ADP of second arm 14A and the distal end portion 14BDP of third arm 14B. Wrist joint J7, located in distal end portion 14ADP, rotatably connects carrier unit 18 to second arm 14A. Wrist joint J7 allows carrier unit 18 and second arm 14A to pivot about wrist axis AxA. Wrist joint J8, located in distal end portion 14BDP, rotatably connects carrier unit 18 to the third arm 14B. Wrist joint J8 allows carrier unit 18 and third arm 14B to pivot about wrist axis AxB.

Wrist joints J7 and J8 allow carrier unit 18 to maintain a controllable orientation during motion of arms 12A, 12B, 14A, 14B, 16A, and 16B. For example, wrist joints J7 and J8 allow carrier unit 18 to maintain a substantially constant orientation when the distance between the distal end portion 14ADP of second arm 14A and distal end portion 14BDP of third arm 14B changes. Wrist joints J7 and J8 also allow control unit 24 to cause carrier unit 18 to rise and/or descend while maintaining the substantially constant orientation. Carrier unit 18 includes a plurality of links and is configured to provide a changeable distance between the distal end of second arm 14A and the distal end of the third arm 14B, as described in detail below.

Carrier unit 18 supports, for example, an end effector for transporting an article between various locations. To assist in the transportation of an article, an end effector that includes a suction device, plurality of gripping robotic fingers, or any other suitable mechanism to securely grasp and transport an article can be fixed to carrier unit 18. When configured in such a manner, robotic handling system 1 including carrier unit 18 is adapted for use in a warehouse environment, for example.

Control unit (controller) 24 is a control device that controls an operation of robotic apparatus 10. Control unit 24 includes circuitry that is configured to performed each of the functions of control unit 24 described herein. Control unit 24 is in communication with robotic apparatus 10 to control the operation the robotic apparatus 10. As depicted in FIG. 1, this communication can be achieved via one or more wires. Control unit 24 can also communicate wirelessly with robotic apparatus 10 to control the operation of robotic apparatus 10 in the manner described herein.

Figure 2:
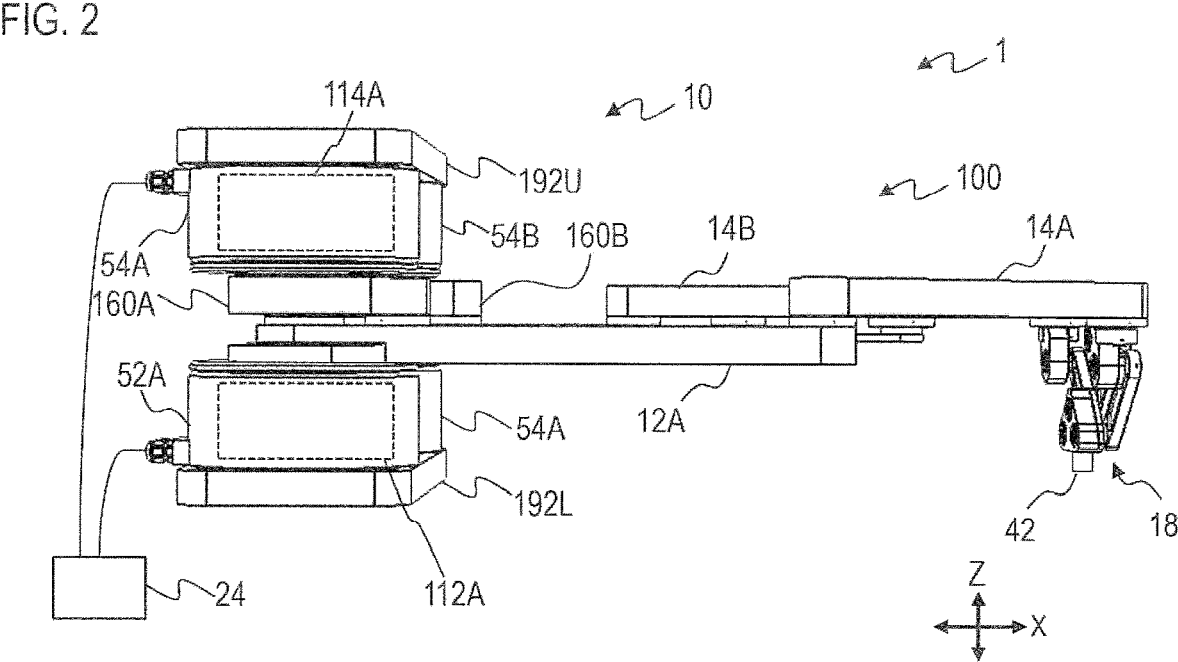
FIG. 2 is a perspective side view of a robotic handling system and a robotic handling apparatus according to an embodiment of the present invention.

FIG. 2 is a perspective side view of a robotic handling system 1 that includes robotic handling apparatus 10, a feedback device 42, and a control unit (controller) 24 according to an embodiment. As can be seen in FIG. 2, a first lower drive unit 112A is disposed within first lower drive housing 52A while a first upper drive unit 114A is disposed within first upper drive housing 54A. A feedback device 42 is disposed on a lower portion of carrier unit 18. Feedback device 42 is a non-contact distance sensor such as a laser distance sensor, a motion sensor such as an interferometer, or another type of feedback device 42. A control unit 24 communicates with the drive units 112A and 114A, feedback device 42, and with drive units 112B, and 114B. Control unit 24 issues commands to control each of the drive units 112A, 112B, 114A, and 114B to position carrier unit 18. Drive units 112A, 112B, 114A, and 114B are constituted by servomotors, for example.

Figure 3:
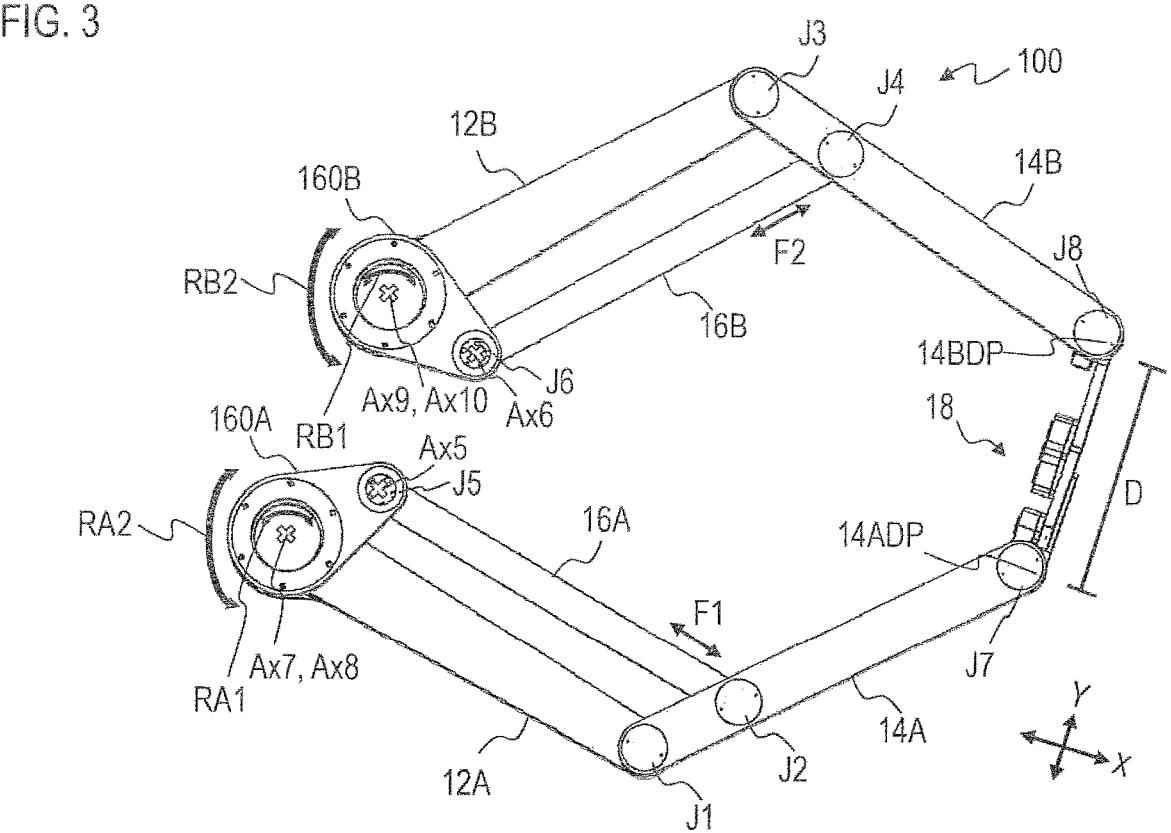
FIG. 3 is a top view of an arm linkage of a robotic apparatus according to an embodiment of the present invention.
Figure 4:
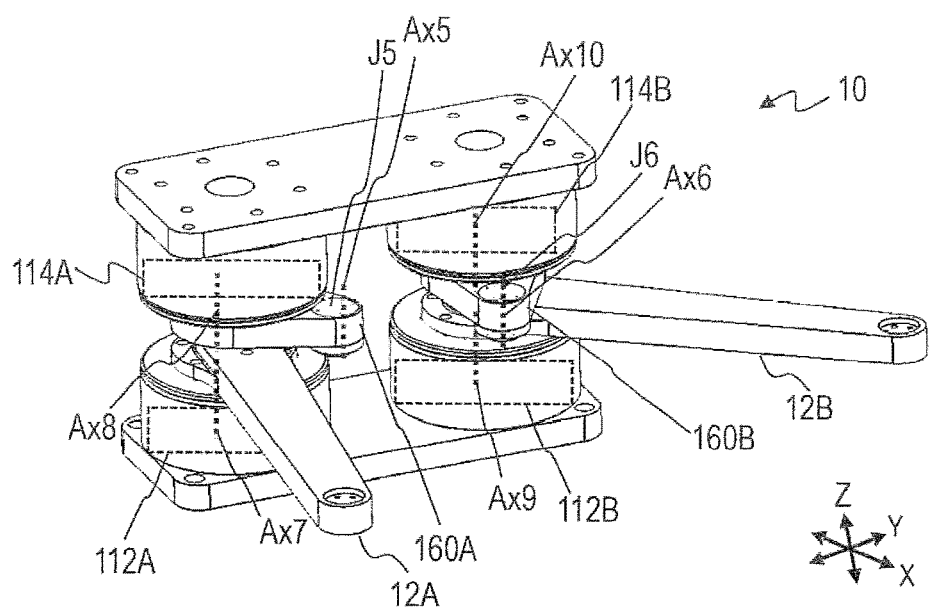
FIG. 4 is a perspective front view of a robotic apparatus according to an embodiment of the present invention.

FIGS. 3 and 4 illustrate the relationship between arm linkage 100 and drive units 112A, 112B, 114A, and 114B. FIG. 3 is a top view of arm linkage 100. FIG. 4 is a perspective front view of robotic apparatus 10, with arms 14A, 14B, 16A, and 16B of arm linkage 100 omitted. As illustrated in FIGS. 3 and 4, first arm 12A is pivotal about an axis Ax7 (first pivot axis) and is brought into pivotal motion by drive unit 112A, thus pivoting (rotating) first arm 12A about axis Ax7 in direction RA1. First crank arm 160A is pivotal about axis Ax8 and is brought into pivotal motion by drive unit 114A, thus pivoting (rotating) crank arm 160A about axis Ax8 in direction RA2. In an exemplary embodiment, axes Ax7 and Ax8 are colinear. Alternatively, axes Ax7 and Ax8 can be offset instead of being colinear.

As illustrated in FIG. 3, motion of arms 12A and 12B in directions RA1 and RB1 allow for the repositioning of the distal end portions 14ADP and 14BDP of arms 12A and 12B. Motion of first crank arm 160A in direction RA2 causes translational motion of carrier arm 16A along direction F1. Similarly, motion of second crank arm 160B in direction RB2 causes translational motion of carrier arm 16B along direction F2. This translational motion causes the proximal end portion of second arm 14A to rotate about joint J1 and the proximal end portion of third arm 14B to rotate about joint J3. Thus, pivotal motion of arms 14A and 14B is achieved by the activation of drive units 114A and 114B, respectively.

The distal end portion 14ADP of second arm 14A is separated from the distal end portion 14BDP of third arm 14B by a distance D, which is a closest distance between distal end portion 14ADP and distal end portion 14BDP. Distance D is measured in a direction parallel to the orientation of carrier unit 18. As the carrier unit 18 is connected to the distal end portions of arms 14A and 14B, distance D also corresponds to a length of the carrier unit. As discussed below, distance D is changeable according to the motion of arms 12A, 12B, 14A, 14B, 16A, 16B, 160A, and 160B.

With reference to FIGS. 3 and 4, fourth arm 12B is pivotal about an axis Ax9 and is brought into pivotal motion by drive unit 112B, thus pivoting fourth arm 12B about axis Ax9 in direction RB1. Crank arm 160B is pivotal about axis Ax10 and is brought into pivotal motion by drive unit 114B, thus pivoting crank arm 160B about axis Ax10 in direction RB2. In an exemplary embodiment, axes Ax9 and Ax10 are colinear. Alternatively, axes Ax9 and Ax10 can be offset in the same manner as axes Ax1 and Ax8.

Figure 5:
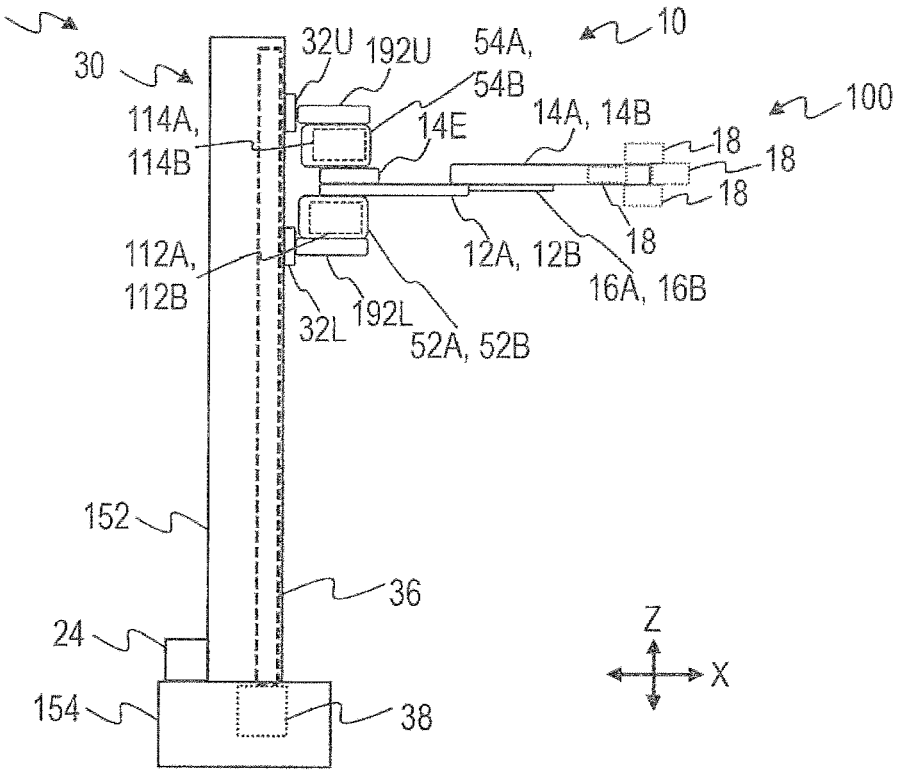
FIG. 5 is a schematic side view of a robotic handling system according to an embodiment of the present invention.

FIG. 5 is a schematic side view of a robotic handling system 1 including a vertical motion mechanism 30 according to an embodiment. As illustrated in FIG. 5, robotic apparatus 10 is secured to vertical motion mechanism 30 by lower guide 32L and upper guide 32U, which are respectively fastened to lower base plate 192L and upper base plate 192U. While one lower guide 32L and one upper guide 32U are depicted in FIG. 5, two or more lower guides 32L and two or more upper guides 32U can be employed. Vertical motion mechanism includes a housing 152 within which a driven mechanism 36 is disposed. Lower and upper guides 32L and 32U connect driven mechanism 36 of vertical motion mechanism 30 to robotic apparatus 10. A base 154 supports housing 152 and includes a vertical motion drive unit 38 disposed therein. Vertical motion drive unit 38 is controlled by instructions output by control unit 24 to bring driven mechanism 36 into motion to raise and lower robotic apparatus 10 via guides 32L and 32U. Driven mechanism 36 is a rotational device such as a ball screw. Drive unit 38 is a servomotor, for example.

Control unit 24 can be fixed to an exterior of housing 152 and/or an exterior of base 154, as depicted in FIG. 5. Alternatively, control unit 24 can be disposed within housing 152 or base 154, to provide additional protection to control unit 24. Control unit 24 can also be attached to robotic apparatus 10, or within one of the drive housings 52A, 52B, 54A, or 54B of robotic apparatus 10.

Carrier unit 18 of robotic apparatus 10 can be disposed at a plurality of positions of arm linkage 100, as illustrated in FIG. 5. For example, carrier unit 18 can be connected to lower surfaces of the distal end portions of second arm 14A and third arm 14B, upper surfaces of the distal end portions of second arm 14A and third arm 14B, outer distal end surfaces of the distal end portions of second arm 14A and third arm 14B (towards direction X in FIG. 5), or inner distal end surfaces of the distal end portions of second arm 14A and third arm 14B (away from the horizontal direction X in FIG. 5).

Figure 6:
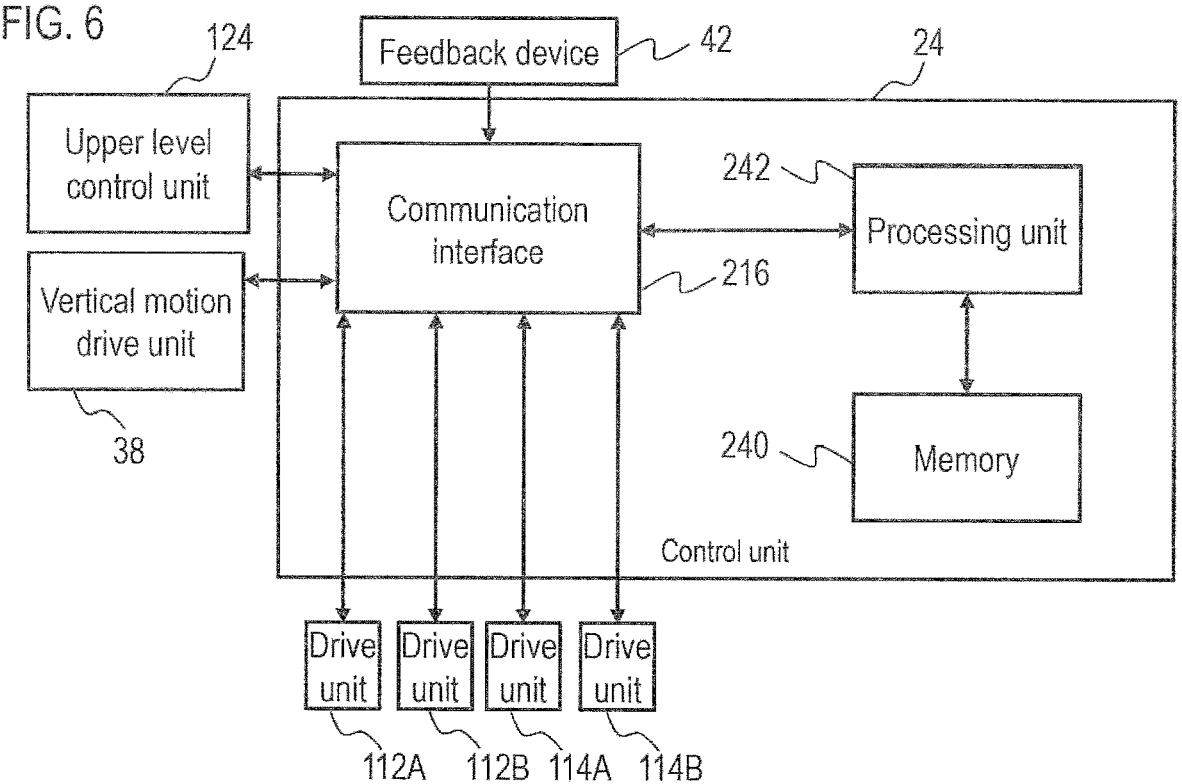
FIG. 6 is a block diagram illustrating a configuration of a control unit according to an embodiment of the present invention.

FIG. 6 illustrates an exemplary configuration of control unit 24. Control unit 24 is a programmable and/or controllable device that outputs commands to robotic apparatus 10 and vertical motion mechanism 30 in a synchronized manner. The operation of the vertical motion drive unit 38 and the operation of drive units 112A, 114A, 112B, and 114B is controlled by control unit 24. Control unit 24 can also control additional drive units in the same manner. When an end effector includes an actuatable mechanism such as a suction device or a gripping device, control unit 24 can provide control of the actuatable mechanism.

Control unit 24 includes a single or central processing unit 242 programmed to perform the various functions to bring about motion of robotic apparatus 10 as described herein. Control unit 24 includes a memory device 240. Memory device 240 includes, for example, a hard disk, solid state storage device, EEPROM, or other non-transitory storage medium capable of long-term storage. In addition to a non-transitory storage medium, memory device 240 can include random access memory. Control unit 24 includes a communication device formed by communication interface 216 that performs motion control and monitoring functions. Communication interface 216 receives feedback from feedback device 42. Feedback is also provided from each of the drive units 112A, 112B, 114A, 114B, and vertical motion drive unit 38. When present, an upper level control unit 124 provides commands or programming to control unit 24. Upper level control unit 124 is a controller configured to control a plurality of control units 24, for example. Communication interface 216 transmits and receives information via wired or wireless communication between feedback device 42, upper level control unit 124, vertical motion drive unit 38, and drive units 112A, 112B, 114A, and 114B.

Figure 7:
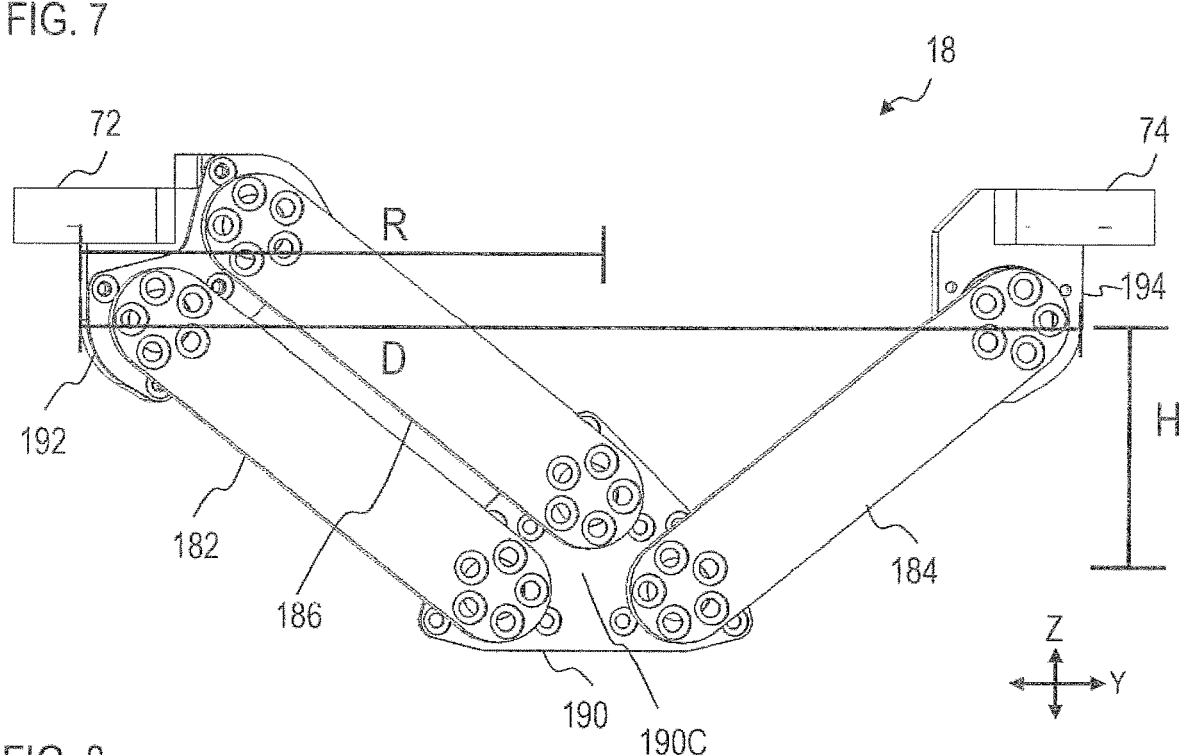
FIG. 7 is a front view of a carrier unit of a robotic apparatus according to an embodiment of the present invention.
Figure 8:
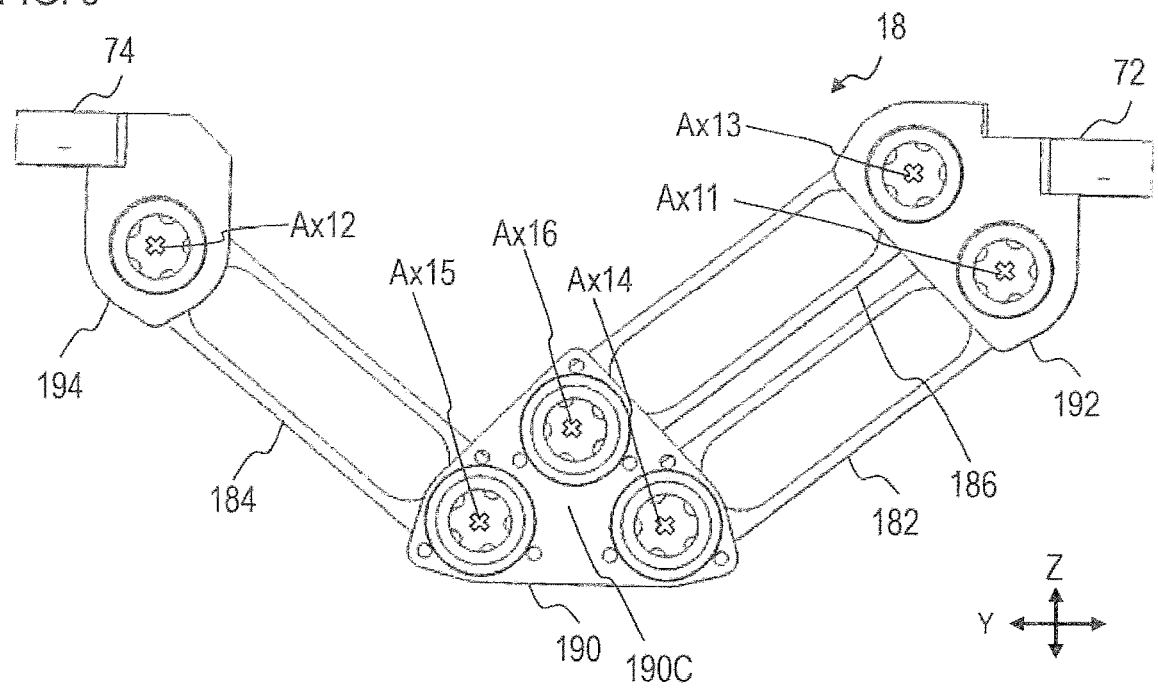
FIG. 8 is a rear view of the carrier unit of the robotic apparatus depicted in FIG. 7 according to an embodiment of the present invention.

FIG. 7 is a front view illustrating a front side of a configuration of carrier unit 18 according to an embodiment. FIG. 8 is a rear view illustrating a rear side of the carrier unit 18 as configured in FIG. 7. As illustrated in FIGS. 7 and 8, a connection portion 72 is connected to a dual plate 192. Connection portion 72 connects to wrist joint J7 in a manner that allows connection portion 72 and dual plate 192 to pivot with respect to distal end portion 14ADP. Plate 192 provides a connection to two carrier links 182 and 186, such that proximal end portions of the carrier links 182 and 186 connected to plate 192 are configured to rotate relative to plate 192 about horizontal axes. Distal end portions of carrier links 182 and 186 extend to a center plate 190 which has a center portion 190C. The distal end portions of carrier links 182 and 186 are connected to attachment portions of center plate 190 and are configured to rotate relative to center plate 190.

Center plate 190 forms an attachment member to which an end effector can be fastened. An end effector can be fastened to center plate 190 with the use of a bolt extending through center portion 190C, for example. Thus, an end effector can extend outward from center portion 190C of center plate 190 in the horizontal direction X. Alternatively, more than one bolt can be employed to secure an end effector to center plate 190. An end effector can similarly be fastened through distal end portions of carrier links 182, 184, and 186. If desired, an end effector can extend inward from center plate 190.

Alternatively, an end effector can be fastened to the flat surface at the bottom of center plate 190. When bolted at this position, an end effector can extend outward in the horizontal direction X, or in a downward direction in the vertical direction Z. When fastened to the bottom of center plate 190, the end effector can include feedback device 42. Alternatively, an end effector can be fastened to the bottom surface of center plate 190 while feedback device 42 is fastened to center portion 190C of center plate 190.

A connection portion 74 is connected to plate 194. Connection portion 74 connects to wrist joint J8 in a manner that allows connection portion 74 and plate 194 to pivot with respect to distal end portion 14BDP. Plate 194 provides a connection to a third carrier link 184 such that the proximal end portion of carrier link 184 that is connected to plate 194 is configured to rotate relative to plate 194 about a horizontal axis. A distal end portion of carrier link 184 extends to center plate 190 on a side opposite the distal end portion of link 182. The distal end portion of link 186 is connected to center plate 190 at a position above center portion 190C.

As illustrated in FIG. 7, plates 192 and 194 and connection portions 72 and 74, as well as wrist joints J7 and J8, are separated from each other by a distance D. This distance D (a changeable distance) also corresponds to the distance between the distal end portions of second arm 14A and third arm 14B, as discussed above. A second distance R (a changeable distance) represents a distance between the center portion 190C of center plate 190 and the plate 192. Second distance R is equal to one half the value of distance D. Thus, second distance R also represents the distance between the connection portion 72 (or wrist joint J7) and the center portion 190C, or the distance between the proximal end portion of link 184 and center portion 190C. As can be seen in FIG. 7, a distance between the proximal end portion of link 186 and the proximal end portion of link 184 is smaller than distance D. The distance between the proximal end portion of link 186 and center portion 190C is smaller than distance R.

The proximal end portions of links 182 and 184 are also separated from center portion 190C of center plate 190 by a vertical distance H. Vertical distance H increases when distance D and second distance R decrease. Similarly, vertical distance H decreases when distance D and second distance R increase. Thus, the respective changes in distance D, second distance R, and vertical distance H are each controllable by control unit 24. Thus, carrier unit 18 has a degree of freedom in vertical direction Z that is realized without raising or lowering any of the arms of robotic apparatus 10 in the vertical direction Z.

As illustrated in FIG. 8, the proximal end portion of link 182 rotates about a horizontal axis Ax11. The proximal end portion of link 184 rotates about horizontal axis Ax12, while the proximal end portion of link 186 rotates about horizontal axis Ax13. The distal end portions of the links 182, 184, and 186 similarly rotate about horizontal axes passing through center plate 190 in order to allow distance D and second distance R to change. As illustrated in FIG. 8, the distal end portion of link 182 rotates about horizontal axis Ax14, while the distal end portion of link 184 rotates about horizontal axis Ax15, and the distal end portion of link 186 rotates about horizontal axis Ax16.

Figure 9A:
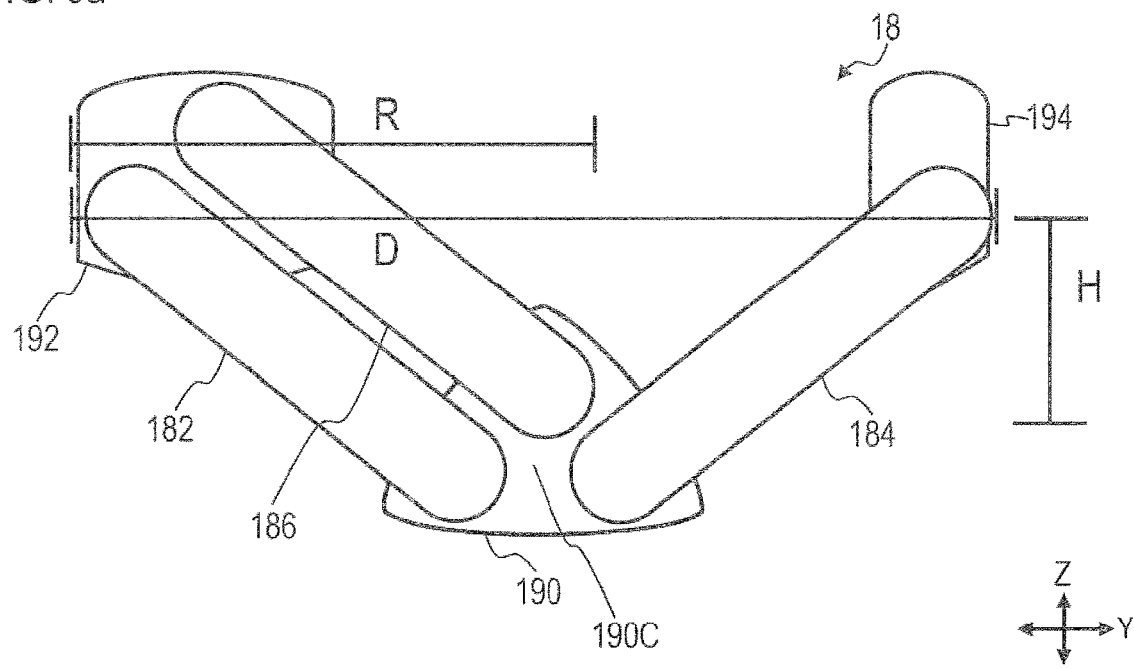
FIG. 9a is a schematic front view of a carrier unit of a robotic apparatus in a first position according to an embodiment of the present invention.
Figure 9B:
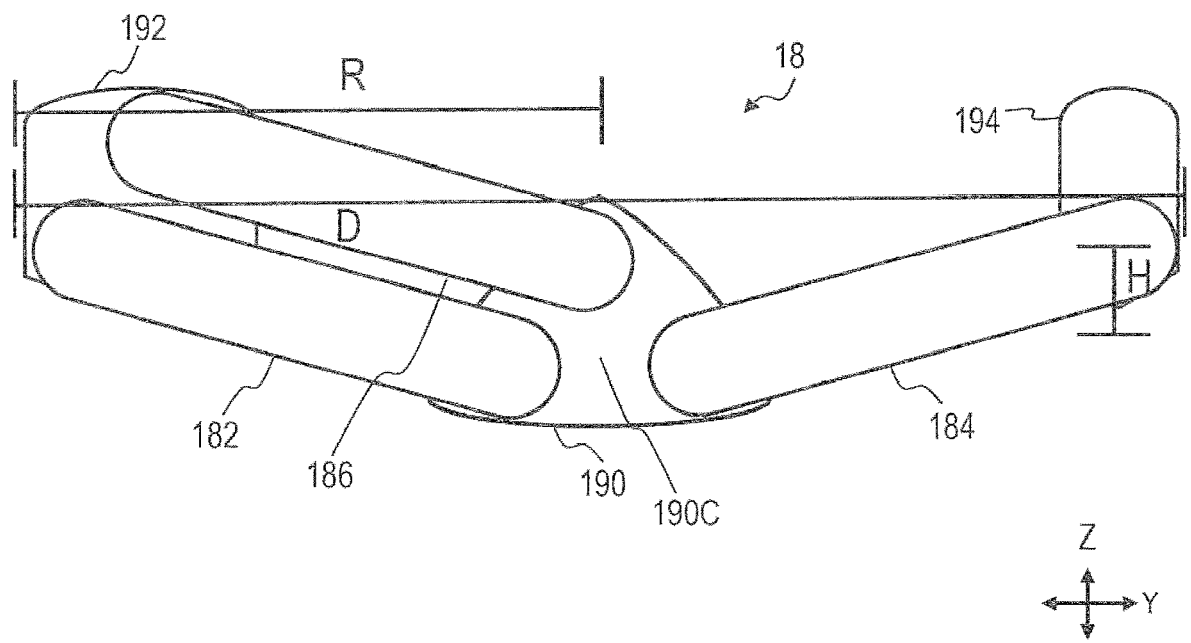
FIG. 9b is a schematic front view of the carrier unit of the robotic apparatus depicted in FIG. 9a in a second position according to an embodiment of the present invention.

FIGS. 9a and 9b are schematic views of the front side of carrier unit 18. For ease of illustration, connection portions 72 and 74 are omitted from FIGS. 9a and 9b. FIG. 9a illustrates carrier unit 18 in a posture corresponding to FIGS. 7 and 8. When the distal end portions of second arm 14A and third arm 14B are moved farther apart, the distance D between plates 192 and 194 and second distance R between plate 192 and center portion 190C are increased, as illustrated in FIG. 9b. In accordance with this motion, vertical distance H decreases. When an opposite motion occurs such that the distal end portions of the second arm 14A and third arm 14B move closer together, distance D and second distance R decrease, while vertical distance H increases. The change in distance H occurs as center plate 190 and center portion 190C move upward and downward relative within vertical direction Z. During this motion, the height of the arms of robotic apparatus 10 can remain constant.

Figure 10A:
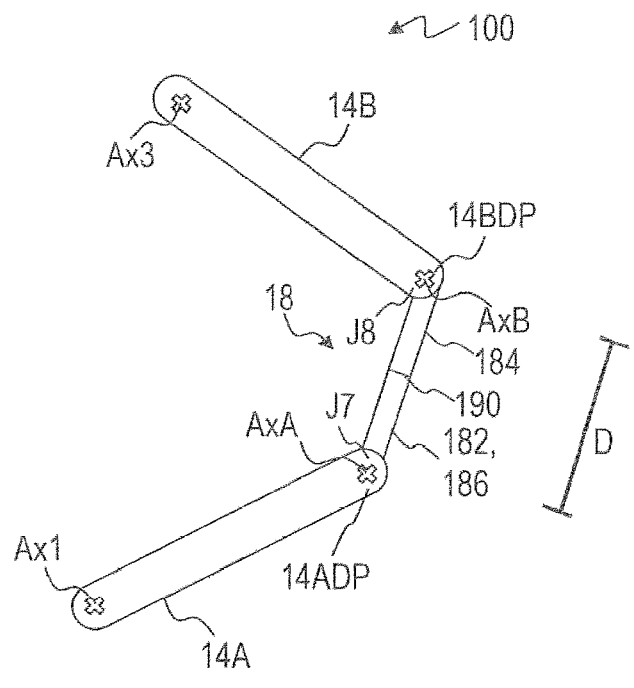
FIGS. 10a-10d are schematic top views illustrating a sequence of postures of arm linkage 100 according to an embodiment of the present invention.
Figure 10B:
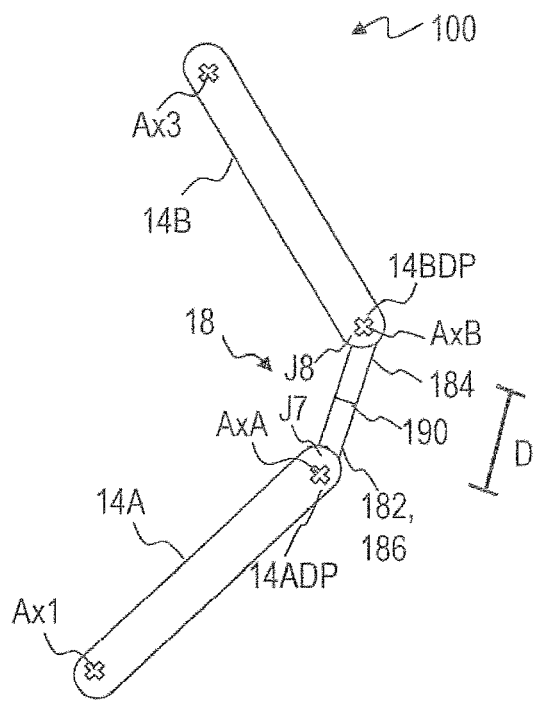

FIGS. 10a-10d illustrate a sequence of postures successively achieved by arm linkage 100. As depicted in FIGS. 10a-10d, carrier unit 18 provides pivotal motion of second arm 14A and 14B with respect to the carrier unit 18 when the arm linkage 100 of robotic apparatus 10 changes posture. FIG. 10a illustrates a posture or arm linkage 100 that corresponds to the posture illustrated in FIG. 3. As can be seen by comparing FIG. 10a and FIG. 10b, wrist joint J7 allows distal end portion 14ADP to rotate about wrist axis AxA with respect to carrier unit 18 when second arm 14A is pivoted about axis Ax1. In a similar manner, wrist joint J8 allows distal end portion 14BDP to rotate about wrist axis AxB with respect to carrier unit 18 when third arm 14B is pivoted about axis Ax3. The changeable distance D of carrier unit 18 allows carrier unit 18 to retract. During this retraction, the proximal end portions of links 182 and 186 adjacent to distal end portion 14ADP are drawn closer to the proximal end portion of link 184 located adjacent to distal end portion 14BDP. Thus, the changeable distance D is reduced and center plate 190 is lowered as depicted in FIGS. 9a and 9b. As depicted in FIGS. 10a and 10b, changeable distance D is changeable without changing the orientation of carrier unit 18.

Figure 10C:
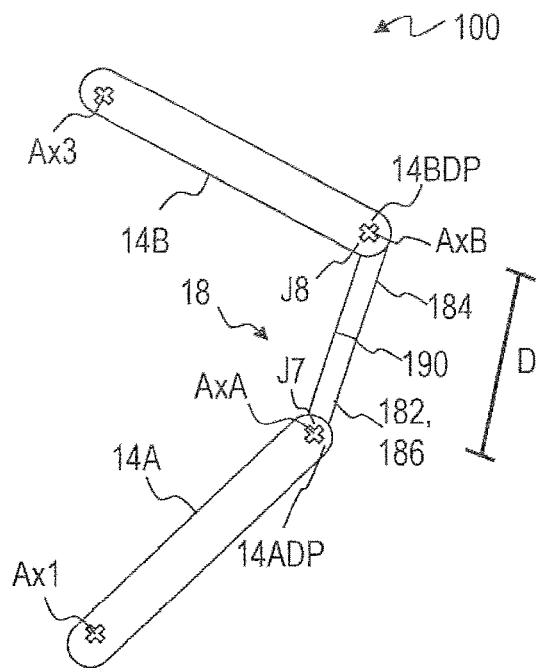

FIG. 10c illustrates a posture in which third arm 14B is pivoted in a counterclockwise direction about axis Ax3 and moved translationally in a direction toward the left of FIG. 10c, as compared to the posture of FIG. 10b. The posture of second arm 14A does not change between FIG. 10b and FIG. 10c. As illustrated by comparing FIGS. 10b and 10c, wrist joint J8 allows distal end portion 14BDP to pivot about wrist axis AxB and to pivot with respect to carrier unit 18. Carrier unit is maintained in a constant orientation during the change in posture from FIG. 10b to FIG. 10c. Also during this change in posture, changeable distance D increases as the proximal end portions of links 182 and 186 are drawn farther from the proximal end portion of link 184. This corresponds to a motion beginning at FIG. 9b and proceeding to FIG. 9a.

Figure 10D:
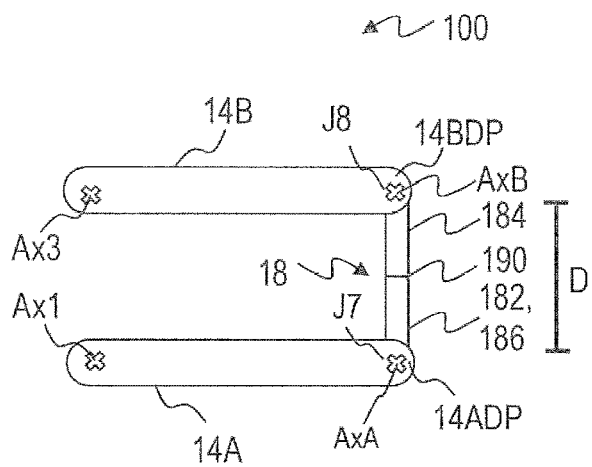

FIG. 10d illustrates a posture in both arms 14A and 14B are rotated while the orientation of carrier unit 18 is changed. Also, at least one of the arms 14A and 14B is translated in the motion from FIG. 10c to FIG. 10d in order to bring distal end portion 14ADP and distal end portion 14BDP into alignment along a vertical direction of FIG. 10d. During this motion, wrist joint J7 allows for pivotal motion of distal end portion 14ADP about wrist axis AxA and wrist joint J8 allows for pivotal motion of distal end portion 14BDP about wrist axis AxB. During this motion, changeable distance D is changeable, allowing links 182 and 186 to move relative to link 184.

Thus, as is clear from FIGS. 9a, 9b, and 10a-10d, wrist joints J7 and J8, in combination with carrier links 182, 184, and 186, facilitate a change in distance D. By providing a structure in which distance D is changeable, robotic apparatus 10 is readily controlled, and an operation of control unit 24 is simplified.

An operation of robotic apparatus 10 will now be described with reference to FIGS. 11a-11e. FIGS. 11a-11e illustrate control of the arm linkage 100 as performed by control unit 24.

Figure 11A:
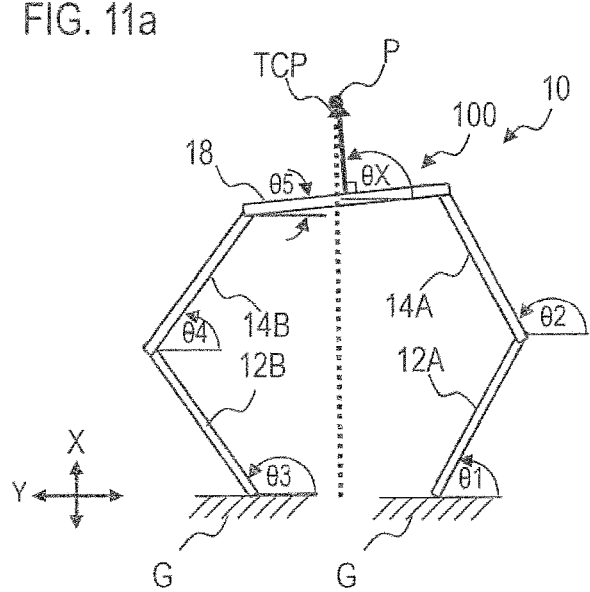
FIGS. 11a-11f are schematic representations of various postures of an arm linkage of a robotic apparatus according to an embodiment of the present invention.
Figure 11B:
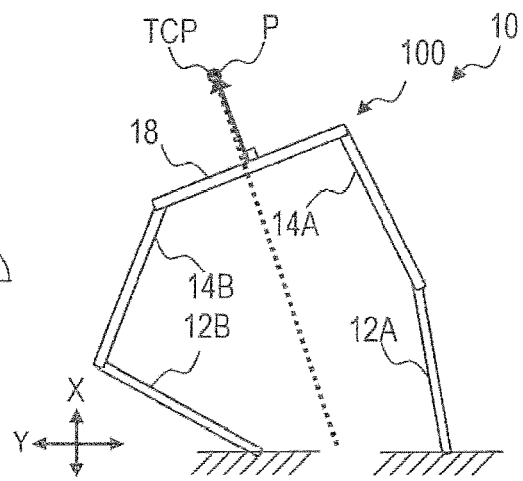
Figure 11C:
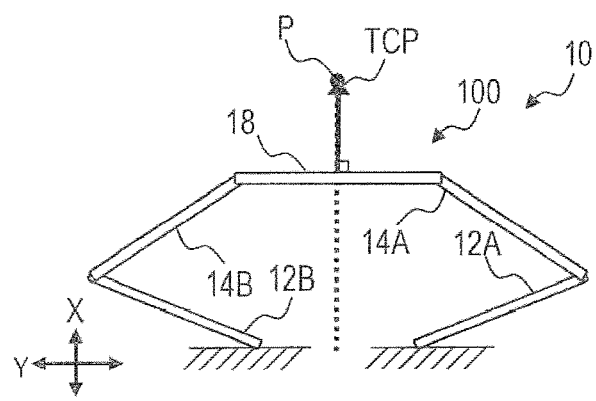
Figure 11D:
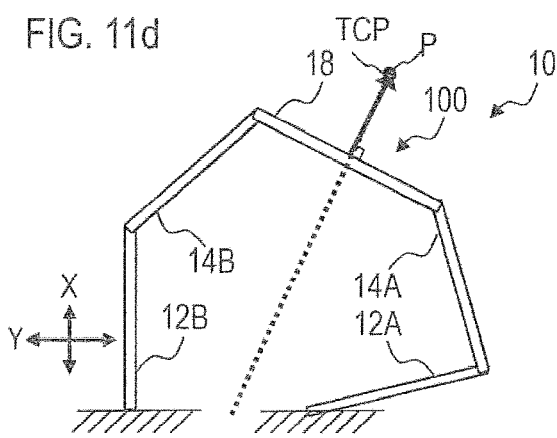
Figure 11E:
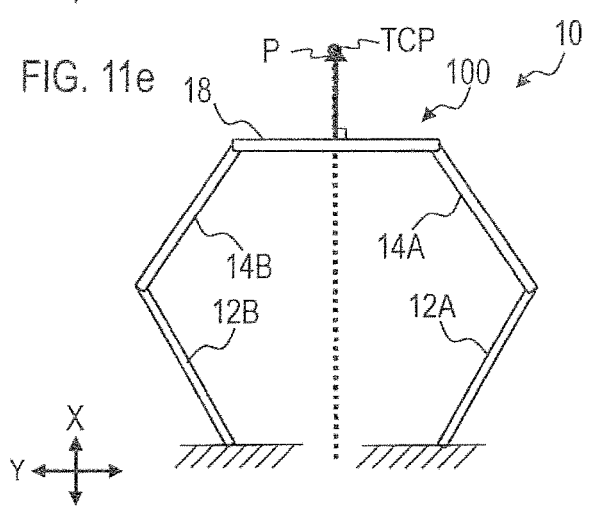

As illustrated in FIG. 11a, arm linkage 100 of robotic apparatus 10 includes five kinematic links and one ground G. Ground G is formed by the connection of the arm linkage 100 to drive housings 52A, 52B, 54A, and 54B. Thus, drive housings 52A, 52B, 54A, and 54B effectively form a single ground G. First, second, third and fourth arms 12A, 14A, 12B, and 14B each form one of the kinematic links. A fourth kinematic link is formed by carrier unit 18. Control unit 24 is configured to control the orientation of each kinematic link. As illustrated in FIG. 11a, control unit 24 is configured to control an orientation of first arm 12A with respect to horizontal direction Y, as indicated by angle θ1. Similarly, control unit 24 controls the orientation second arm 14A makes with respect to the horizontal direction, as indicated by angle θ2. The orientation of the fourth arm 12B is controlled with respect to the horizontal direction, as represented by angle θ3. In the same manner, control unit 24 controls the orientation of third arm 14B with respect to the horizontal direction Y as indicated by angle θ4. Carrier unit 18 is fixed to the distal end portion 14ADP of second arm 14A and distal end portion 14BDP of third arm 14B and is orientated with respect to the horizontal direction Y by an angle θ5. The orientation of carrier unit 18 with respect to horizontal direction Y is represented by angle θX. Angle θX is 90 degrees when carrier unit is aligned with horizontal direction Y, as illustrated in the exemplary postures of FIGS. 11c and 11e. The values of each of the angles θ1-θ5 and θX, and the location of tool center point TCP are determined by control unit 24 from the feedback provided to control unit 24 from each of the drive units 112A, 112B, 114A, and 114B, for example. Thus, control unit 24, by employing either inverse kinematics or forward kinematics, controls arm linkage 100 to move between a plurality of desired postures, while controlling the path of each of the arms and the carrier unit 18.

With continued reference to FIG. 11a, a tool center point, TCP, is located at a particular location in the X direction, Y direction, and Z direction. Tool center point TCP is the center point of an end effector attached to carrier unit 18, for example. Tool center point TCP extends from center portion 190C of center plate 190 when an end effector is bolted to center portion 190C. For example, the tool center point TCP extends orthogonally from center plate 190. The posture of arm linkage 100 is changeable in order to place the tool center point TCP at a desired position P, the position P having a particular location in the X direction, Y direction, and Z direction.

As is clear from FIG. 11a, by placing drive units capable of pivoting arms 12A, 14A, 12B, and 14B about angles θ1, θ2, θ3, and θ4, all five angles θ1-θ5 are controllable. The orientation of carrier unit 18, as indicated by angle θX, is also controllable. Thus, arm linkage 100 provides four degrees of active control for tool center point TCP: the X direction, the Y direction, the Z direction, and the orientation of the tool center point TCP (e.g. angle θX). The manipulation of angles θ1-θ5 provides three degrees of freedom: the horizontal direction Y, the horizontal direction X, and the orientation (e.g. angle θX) of the carrier unit 18. A fourth degree of freedom in the vertical direction Z is provided by the ability of carrier unit 18 to be raised and lowered by changing distance D. This fourth degree of freedom is realized without raising or lowering any of the arms of robotic apparatus 10 in the vertical direction Z. The range of motion in the vertical direction Z can be increased by the provision of a vertical motion drive unit 38, as discussed with respect to FIG. 5.

With continued reference to FIG. 11a, drive unit 112A controls pivotal motion of first arm 12A by changing angle θ1. Drive unit 114A controls pivotal motion of second arm 14A by changing angle θ2. Drive unit 112B controls pivotal motion of fourth arm 12B by changing angle θ3. Drive unit 114B controls pivotal motion of third arm 14B by changing angle θ4. As illustrated in FIGS. 1-4, the angles θ1-θ4 can be changed directly, as is the case in arms 12A and 12B and angles θ1 and θ3, for example. The change in angles θ1-θ4 can also be changed indirectly, via the motion of one or more intermediate members, as is the case with respect to arms 14A and 14B, which are pivoted by the operation of arms 16A, 16B, 160A, and 160B. By controlling the orientations of the arms 12A, 12B, 14A, and 14B, control unit 24 is also configured to control the orientation of carrier unit 18, which forms a fifth link. The orientation of carrier unit 18 is determined by the position of the distal end portions of arms 14A and 14B. Specifically, the carrier unit 18 is oriented by the angle θX, which is normal to a plane connecting the distal end portions 14ADP and 14BDP of arms 14A and 14B. Thus, by positioning the distal end portions of arms 14A and 14B, control unit 24 can orient carrier unit 18 as desired. Therefore, control unit 24 is also configured to control angle θX, even though angle θ5 is not directly changed by a drive unit, but rather by the position of the distal ends of arms 14A and 14B.

Figure 11F:
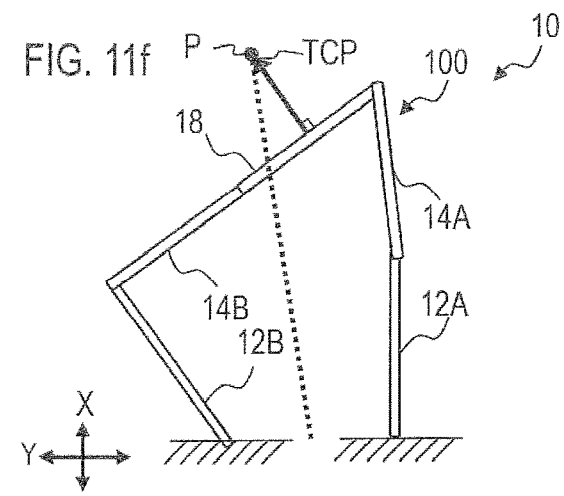

FIGS. 10a-10f illustrate a variety of postures that are achievable with arm linkage 100. Each of these positions can be readily achieved by the control of drive units 112A, 112B, 114A and 114B. These postures are each achievable according to the operation of the drive units 112A, 112B, 114A, and 114B. Furthermore, by controlling the distance D or the second distance R, the height H of tool center point TCP can be modified. FIG. 11f illustrates an exemplary configuration in which a distance between distal end portion 14ADP and distal end portion 14BDP is reduced. This distance is represented by the length of carrier unit 18 in FIG. 11f.

FIG. 11f illustrates a posture of arm linkage 100 in which third arm 14B and carrier unit 18 are substantially aligned with each other or colinear. This posture is an exemplary singularity position or posture. Specifically, control unit 24 is configured to control each of the angles θ1-θ5 and θX of the arms of arm linkage 100 so as to align two of the kinetic links. For example, third arm 14B and carrier unit 18 can be aligned, as illustrated in FIG. 11f. Thus, robotic apparatus 10 is advantageously configured to place two adjacent links of arm linkage 100 in an aligned position, while performing control of the robotic apparatus 10 via inverse kinematics or forward kinematics. This configuration advantageously achieves reduced complexity of the robotic apparatus 10. For ease of illustration, the identification of angles θ1-θ5 and θX is omitted from FIGS. 11b-11f.

Figure 12A:
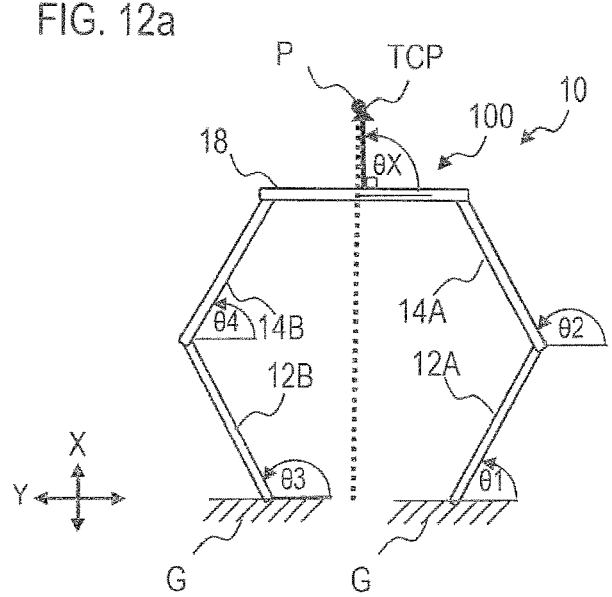
FIGS. 12a-12c are schematic representations of various postures of an arm linkage with a carrier unit maintained at a constant orientation according to an embodiment of the present invention.
Figure 12B:
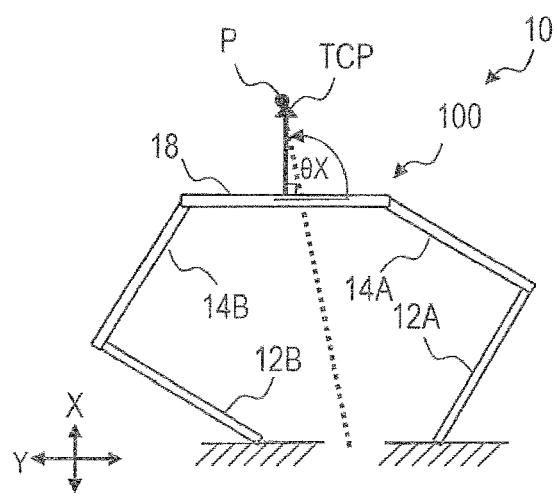
Figure 12C:
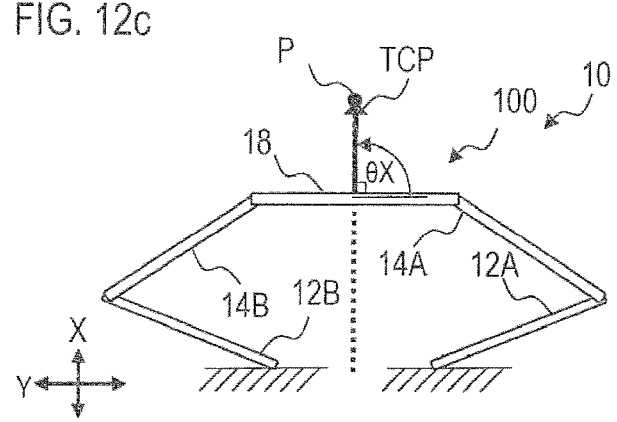

FIGS. 12a-12c illustrate a variety of postures that are achievable with arm linkage 100 while maintaining carrier unit 18 at a constant angle. Each of these postures is achievable due to the presence of wrist joints J7 and J8. Control of the orientation of carrier unit 18 is possible without the need to provide a drive unit to directly drive either wrist joint J7 or J8 and without the need to provide a locking mechanism at either wrist joint J7 or J8. In the example depicted in FIGS. 11a-11c, the orientation of carrier unit 18 is aligned with the horizontal Y direction. Thus, angle θX can remain constant at 90 degrees with respect to the horizontal direction Y, or at another desirable orientation. For ease of illustration, the identification of angles θ1-θ5 is omitted from FIGS. 11b and 11c.

Figure 13:
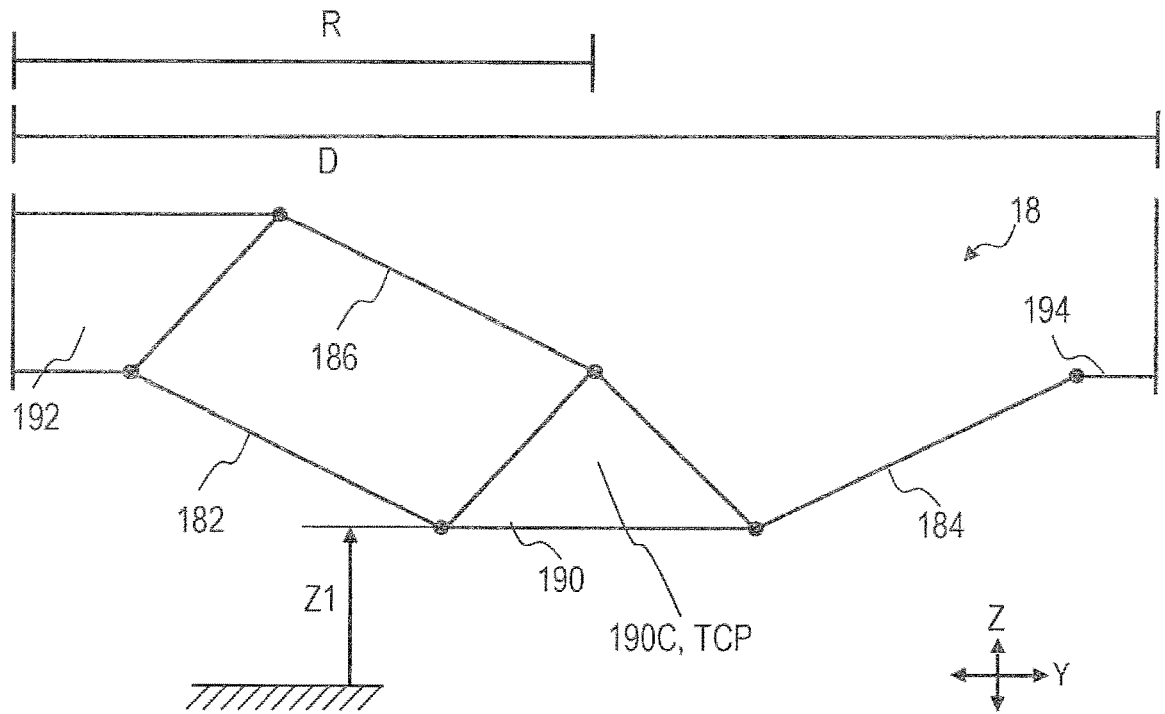
FIG. 13 is a schematic illustrating control of a carrier unit according to an embodiment of the present invention.

FIG. 13 is a schematic representation illustrating a control of carrier unit 18, as viewed from a plane facing carrier unit 18. As illustrated in FIG. 13, when distance D (and second distance R) are increased, center plate 190 and the corresponding tool center point are raised in the positive Z direction, as indicated by exemplary height Z1. When distance D (and second distance R) are reduced, center plate 190 and the corresponding tool center point are lowered in the direction opposite to the positive Z direction, in a downward direction relative to Z1. Thus, the tool center point TCP and the carrier unit 18 can be raised or lowered without raising or lowering any of the arms 12A, 12B, 14A, 14B, 16A, 16B, or first and second crank arms 160A and 160B. Furthermore, by allowing distance D (and second distance R) to change in such a manner, control unit 24 is configured to allow two of the arms to achieve a parallel orientation with respect to each other, as illustrated in FIG. 11f for example, without increasing the complexity of the control performed by control unit 24.

In order to position tool center point TCP at a particular location and control the posture of each of the arms 12A, 12B, 14A, and 14B, and carrier unit 18, inverse kinematics can be employed. Specifically, distance D can be controlled by controlling second distance R, which is equal to half of distance D. Second distance R can be determined according to equation 1 below.

$$\frac{dR}{dt} = \frac{dZ1}{dt}\left(\frac{182L - Z1}{R - 192L - 190R}\right) \quad (1)$$

In equation (1), R and Z1 are the lengths of second distance R and distance Z1, 182L is a length of carrier link 182, 192L is a length between wrist joint J7 and axis Ax11 in plate 192, and 190R is half of the length of the widest portion of center plate 190. It is assumed that the length of plate 194, as measured from wrist joint J8 to axis Ax12, is equal to length 192L. Similarly, a length of third carrier link 184 is assumed to be equivalent to length 182L.

Figure 14:
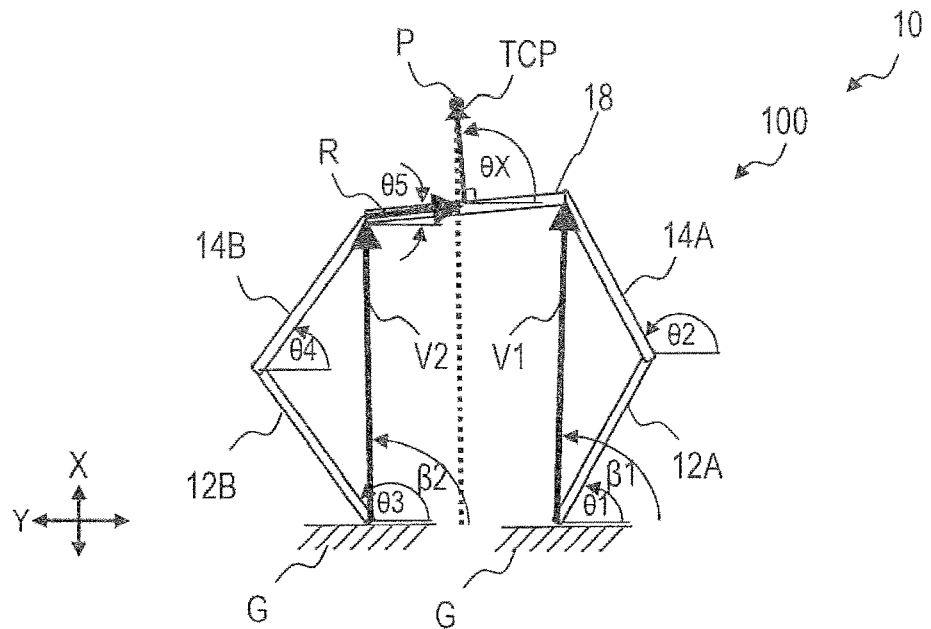
FIG. 14 is a schematic illustrating control of a posture of an arm linkage of a robotic apparatus according to an embodiment of the present invention.

FIG. 14 illustrates an exemplary control of the posture of arms 12A, 12B, 14A, 14B and control of orientation of carrier unit 18 performed by control unit 24. Specifically, a vector V1 determined by control unit 24 corresponds to the location of wrist joint J7. Vector V1 extends from a point located on axes Ax1 and Ax8 (see FIG. 4). Vector V2 is determined by control unit 24 and corresponds to the location of wrist joint J8. Vector V2 extends from a point located on axes Ax9 and Ax10 (see FIG. 4). The control unit 24 can thereby determine the commands for each of the drive units 112A, 112B, 114A, and 114B by reverse kinematics. Furthermore, control unit can control the orientation of the carrier unit by controlling the angle θX. Thus, control unit 24 is programmable by a user such that the user can provide a command for the orientation of the carrier unit and an end effector attached thereto by providing a desired value for the angle θX. Furthermore, control unit 24 is programmable such that a user can specify one or more locations for tool center point TCP. Control unit 24 issues appropriate commands to each of the drive units 112A, 112B, 114A, and 114B to carry out operation of robotic apparatus 10 and arm linkage 100 according to the programming provided by the user.

Control of the posture of each of the arms 12A, 12B, 14A, and 14B can be performed based on the following equations (2)-(5):

$$\theta1 = \beta1 - \arccos\left(\frac{V1}{2L}\right) \quad (2)$$

$$\theta2 = \beta1 + \arccos\left(\frac{V1}{2L}\right) \quad (3)$$

$$\theta3 = \beta2 - \arccos\left(\frac{V2}{2L}\right) \quad (4)$$

$$\theta4 = \beta2 + \arccos\left(\frac{V2}{2L}\right) \quad (5)$$

In equations (2)-(5), β1 is an angle representing an orientation of vector V1, as illustrated in FIG. 14, β2 is an angle representing an orientation of vector V2, and length 2L is a length of one of the arms 12A, 12B, 14A, and 14B. In an exemplary embodiment corresponding to equations (2)-(5) the length of all of the arms 12A, 12B, 14A, and 14B is equal.

Control of the orientation of the carrier unit 18 can be performed based on the derivative of the value of angle θ5. Thus, control unit 24 is configured to perform control of robotic apparatus 10 in a straightforward manner. While the above examples provide a detailed description of an exemplary inverse kinematics control, forward kinematics control can also be performed by control unit 24.

Figure 15A:
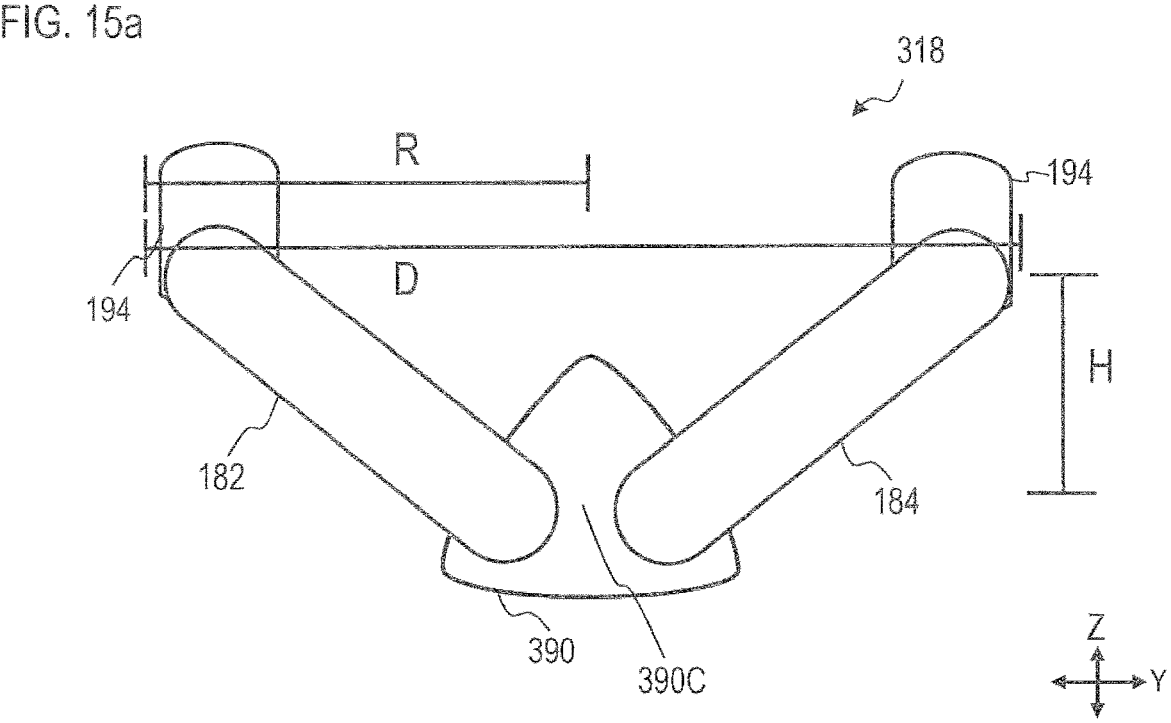
FIG. 15a is a schematic view of a modified carrier unit of a robotic apparatus in a first position according to an embodiment of the present invention.
Figure 15B:
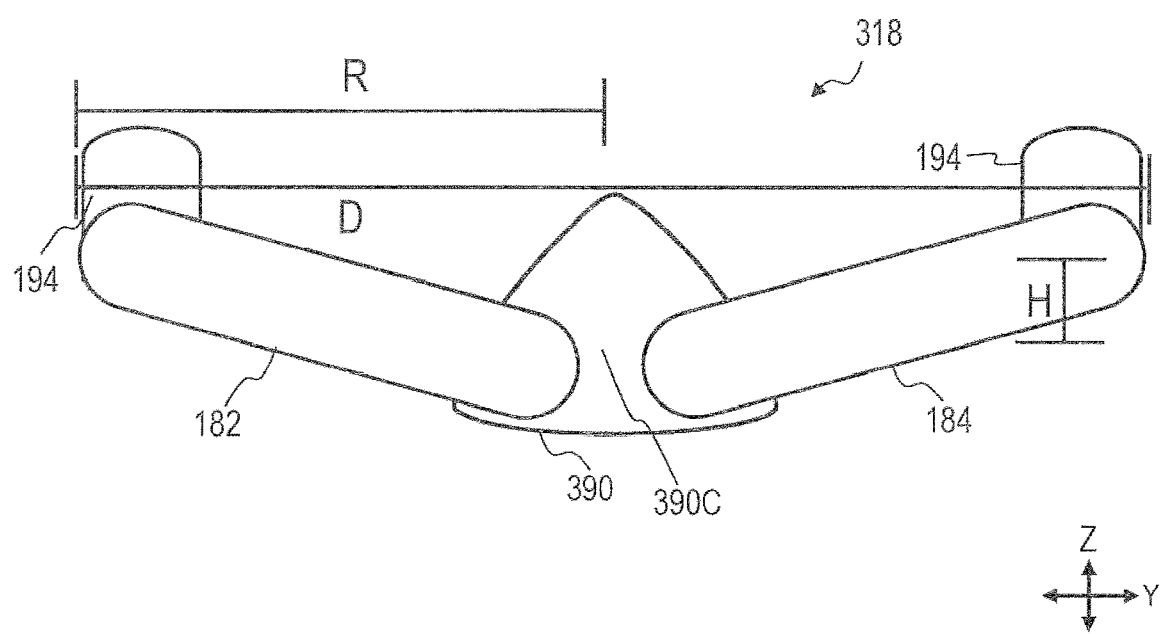
FIG. 15b is a schematic view of the modified carrier unit of the robotic apparatus depicted in FIG. 15a in a second position according to an embodiment of the present invention.

FIGS. 15a and 15b illustrate an operation of a carrier unit 318 according to another embodiment. Carrier unit 318 is configured to be attached to distal end portions of arms 14A and 14B in the same manner as carrier unit 18. As illustrated in FIGS. 15a and 15b, carrier unit 318 includes two plates 194, each of which is connected to a respective movable carrier link of carrier links 182 and 184. Thus, in contrast to carrier unit 18, carrier unit 318 requires only two carrier links, requiring only two attachment portions on the corresponding center plate 390. The distance D, second distance R, and height H are changeable in the same manner as in carrier unit 18. Like carrier unit 18, carrier unit 318 can be configured to grasp and transport an article. Carrier unit 318 can be provided with a suction device, plurality of gripping robotic fingers, or any other suitable mechanism to securely grasp and transport an article. Preferably, carrier unit 318 is operated in a fully constrained manner such that links 182 and 184 are prevented from becoming colinear.

Figure 16:
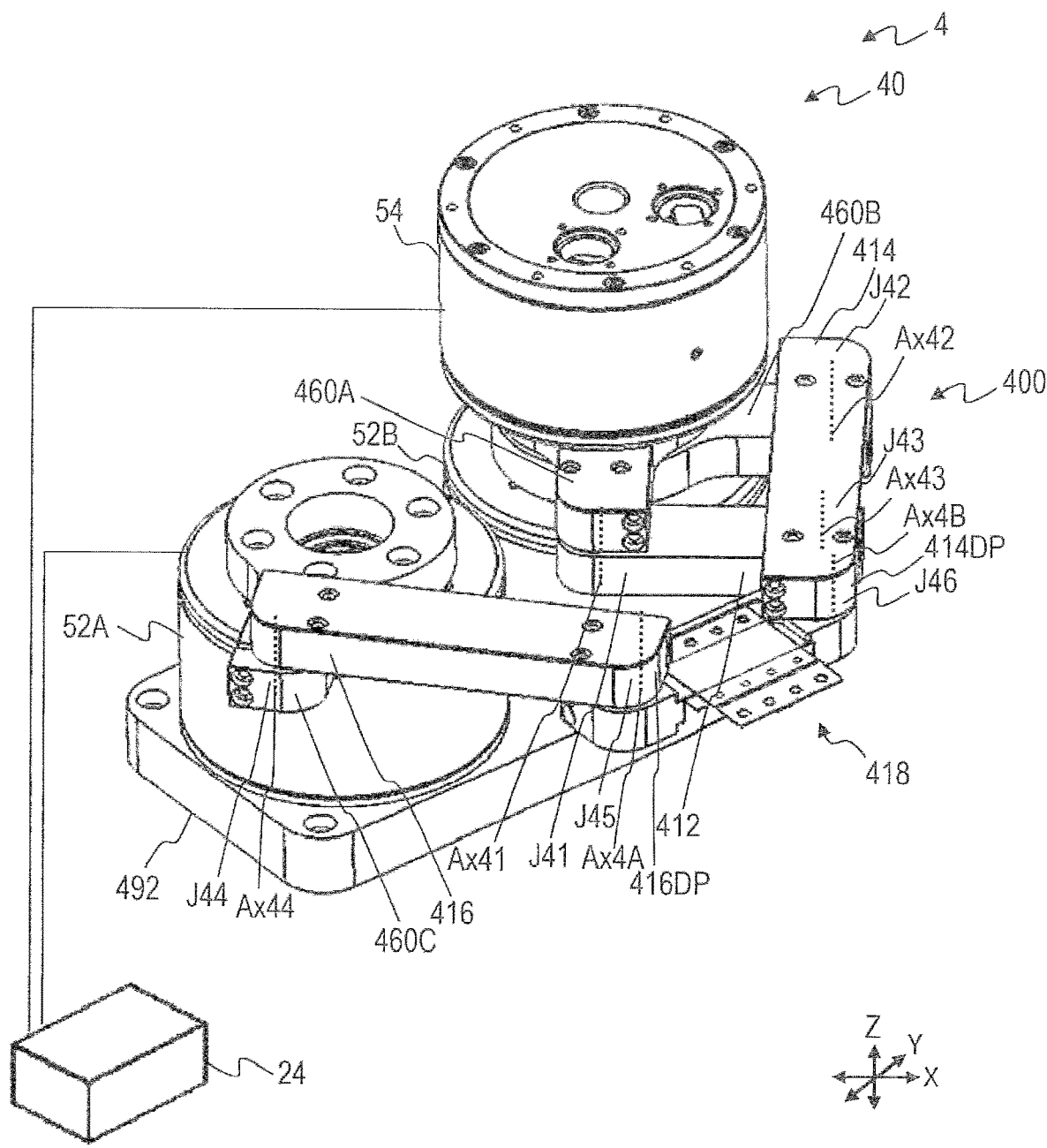
FIG. 16 is a perspective view of a robotic apparatus according to an embodiment of the present invention.

FIG. 16 is a perspective view of a robotic handling system 4 that includes robotic handling apparatus 40 according to an embodiment. The robotic apparatus 40 includes a first lower drive housing 52A, second lower drive housing 52B, and upper drive housing 54. A base plate 492 supports each of the drive housings, and is rigidly fixed to first lower drive housing 52A and second lower drive housing 52B. Upper drive housing 54 has the same structure as upper drive housing 54A or 54B. An arm linkage (link mechanism) 400 extends from the drive housings 52A, 52B, and 54.

Arm linkage 400 of robotic apparatus 40 includes three arms (arm members) 412, 414, and 416, three crank arms 460A, 460B, and 460C, and a carrier unit 418. First arm (first arm member) 412 has a proximal end portion connected to a distal end portion of crank arm 460A. Second arm (second arm member) 414 has a proximal end portion connected to a distal end portion of crank arm 460B. A distal end portion of first arm 412 is connected to a second arm 414 via a joint J43 such that the second arm 414 is pivotable with respect to first arm 412. Third arm (third arm member) 416 has a proximal end portion connected to an end of crank arm 460C.

With continued reference to FIG. 16, first crank arm 460A has a proximal end portion that is rotatably connected to upper drive housing 54 and drive unit 114 housed therein. A distal end portion of crank arm 460A is connected to a proximal end portion of first arm 412 via a joint J41 that allows first arm 412 to pivot about axis Ax41 (first pivot axis). Crank arm 460B has a proximal end portion that is rotatably connected to lower drive housing 52B. A distal end portion of second crank arm 460B is connected to a proximal end portion of second arm 414 via a joint J42 that allows second arm 414 to pivot about axis Ax42 (second pivot axis). A distal end portion of first arm 412 is connected to second arm 414 via a joint J43 that allows second arm 414 to pivot about axis Ax43. Joint J43 is disposed between the proximal end portion of second arm 414 and the distal end portion 414DP of second arm 414. Crank arm 460C has a proximal end portion that is rotatably connected to lower drive housing 52A. A distal end portion of crank arm 460C is connected to a proximal end portion of third arm 416 via a joint J44 that allows third arm 416 to pivot about axis Ax44 (third pivot axis).

Carrier unit 418 is connected to the distal end portion 414DP of second arm 414 and the distal end portion 416DP of third arm 416. Wrist joint J46, located at distal end portion 414DP, pivotally connects carrier unit 418 to second arm 414 about wrist axis Ax4B. Wrist joint J45, located at distal end portion 416DP, pivotally connects carrier unit 418 to the third arm 416 about wrist axis Ax4A. Wrist joints J45 and J46 allow carrier unit 418 to maintain a controllable orientation during motion of arms 412, 414, and 416. For example, wrist joints J45 and J46 allow control unit 24 to maintain carrier unit 418 at a substantially constant orientation when the posture of arms 412, 414, and 416 changes. Of course, control unit 24 is configured to manipulate the orientation of the carrier unit 418 as desired. Carrier unit 418 can operably support an end effector having a suction device, plurality of gripping robotic fingers, or any other suitable mechanism to securely grasp and transport an article. Carrier unit 418 is a fixed or substantially rigid carrier unit that does not provide a changeable distance between distal end portion 414DP and 416DP. Thus, the distance between distal end portion 414DP and distal end portion 416DP can be fixed by carrier unit 418.

When the carrier unit does not allow for a changeable distance, control unit 24 is configured to maintain distal end portion 414DP and distal end portion 416DP at a constant distance with respect to each other while the posture of arms 412, 414, and 416 changes. If desired, control unit 24 can also maintain distal end portion 414DP and distal end portion 416DP at a constant distance with respect to each other even when a carrier unit with a changeable distance is employed.

Robotic handling system 4 can include a vertical motion mechanism 30 as illustrated in FIG. 5. By attaching robotic apparatus 40 to vertical motion mechanism 30, the robotic apparatus 40 can be raised and lowered by control unit 24 as discussed with respect to robotic handling system 1.

Figure 17:
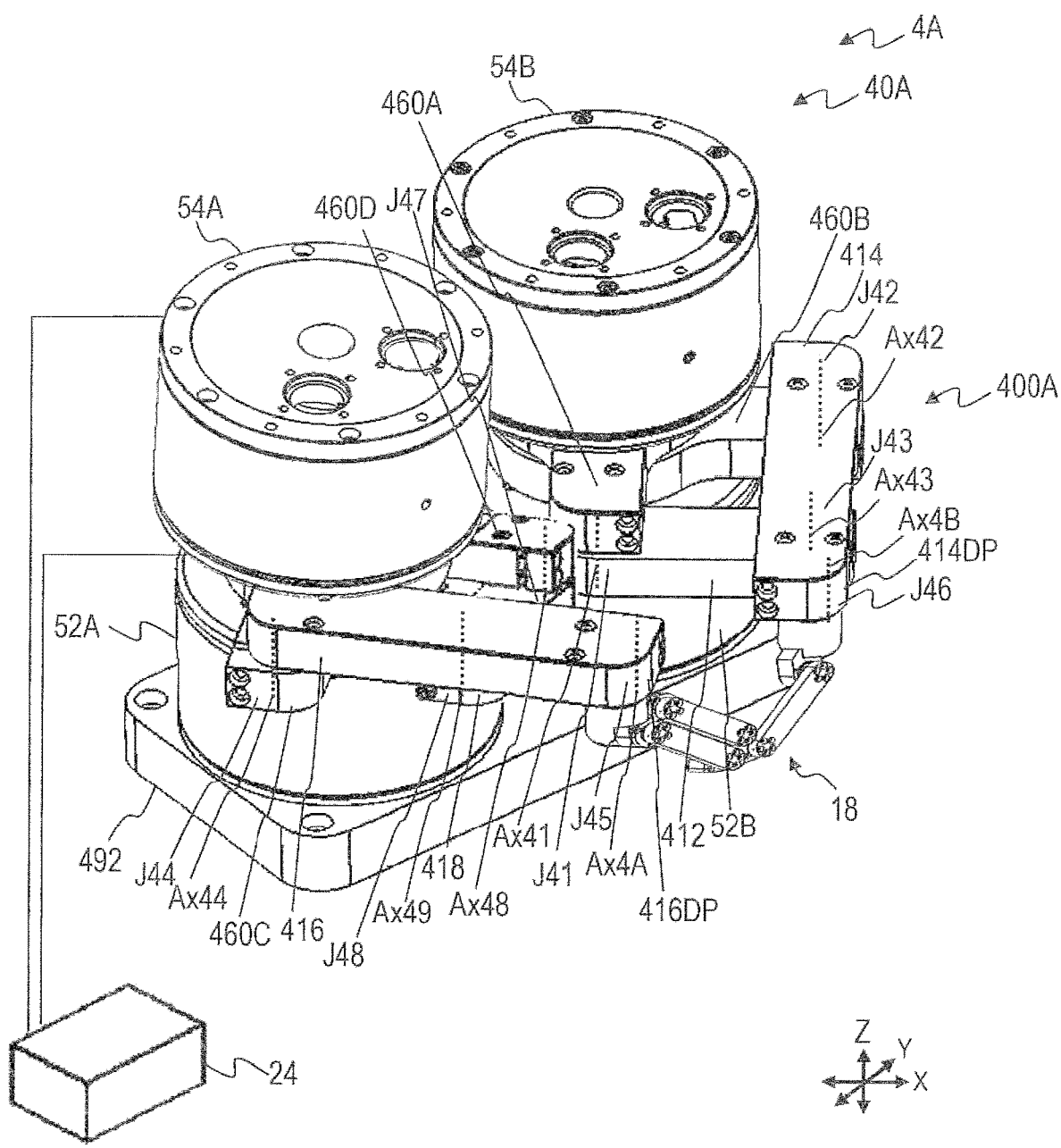
FIG. 17 is a perspective view of the robotic apparatus depicted in FIG. 15 with a carrier unit according to an embodiment of the present invention.

FIG. 17 illustrates a robotic handling system 4A which includes a robotic apparatus 40A according to an embodiment. Robotic apparatus 40A is similar to robotic apparatus 40. However, unlike robotic apparatus 40, robotic apparatus 40A is employed with carrier unit 18 which has a changeable distance D, a fourth arm 418, and a fourth crank arm 460D. Carrier unit 18 of robotic handling apparatus 40A corresponds to carrier unit 18 discussed with respect to robotic apparatus 10, and as illustrated in FIGS. 1-3 and 9a-13. When a carrier unit with a changeable distance D is employed, such as carrier unit 18 or 318, wrist joints J45 and J46 allow the carrier unit to rise and descend while maintaining a substantially constant orientation in the same manner as robotic apparatus 10. Wrist joints J45 and J46 also allow carrier unit 18 or 318 to maintain a constant distance and orientation when the posture of arm linkage 400A changes by allowing pivotal motion about wrist axes Ax4A and Ax4B.

Robotic handling apparatus 40A includes fourth crank arm 460D in addition to crank arms 460A, 460B, and 460D. Fourth crank arm 460D has a proximal end portion rotatably connected to upper drive housing MA. A distal end portion of fourth crank arm 460C is connected to a proximal end portion of fourth arm 418 via a joint J47 that allows fourth arm 418 to pivot about axis Ax48. A distal end portion of fourth arm 418 is connected to third arm 416 via a joint J48 that allows fourth arm 418 to pivot about axis Ax49.

By providing first arm 412, second arm 414, third arm 416, fourth arm 418, and drive units within respective housings 52A, 52B, MA, and 54B, robotic apparatus 40A operates with a carrier unit 18 having a changeable distance in the same manner as discussed above with respect to robotic apparatus 10. Like robotic handling system 4, robotic handling system 4A can include a vertical motion mechanism 30 as illustrated in FIG. 5. By attaching robotic apparatus 40A to vertical motion mechanism 30, the robotic apparatus 40A can be raised and lowered by control unit 24 as discussed with respect to robotic handling system 1.

Figure 18:
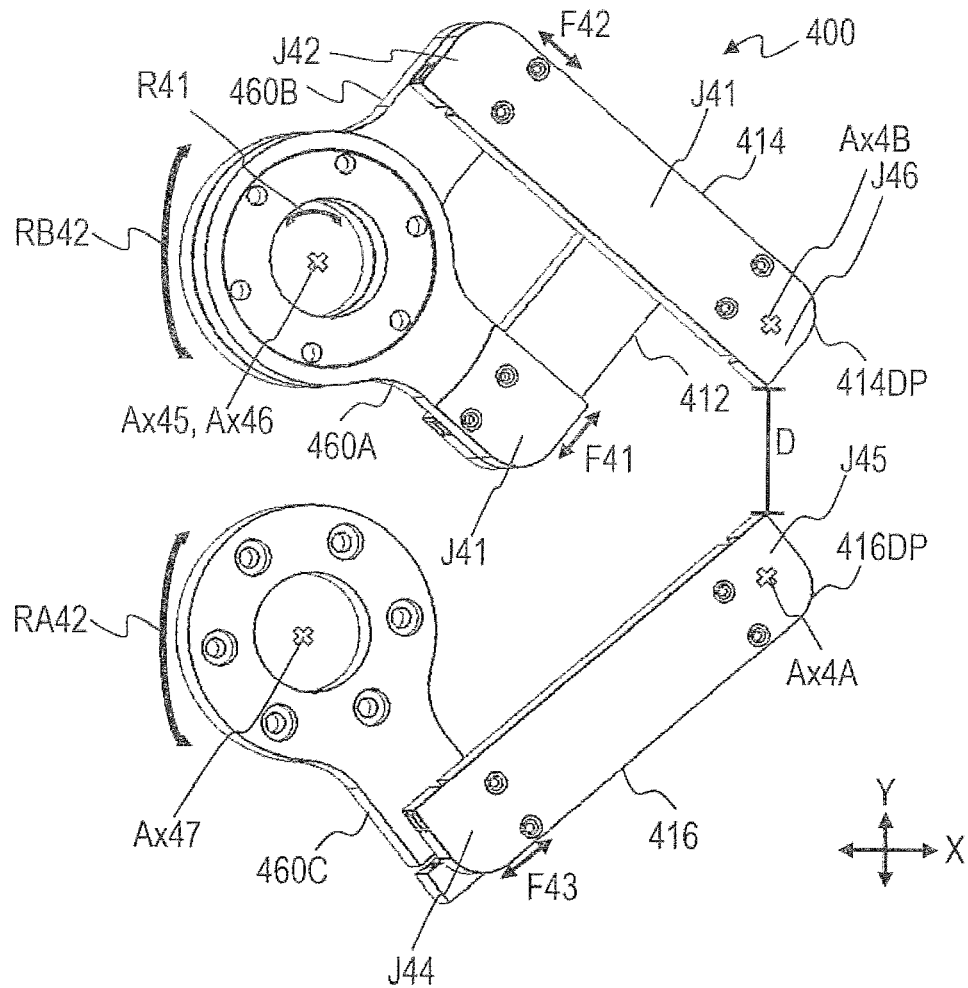
FIG. 18 is a perspective top view of an arm linkage of a robotic apparatus according to an embodiment of the present invention.
Figure 19:
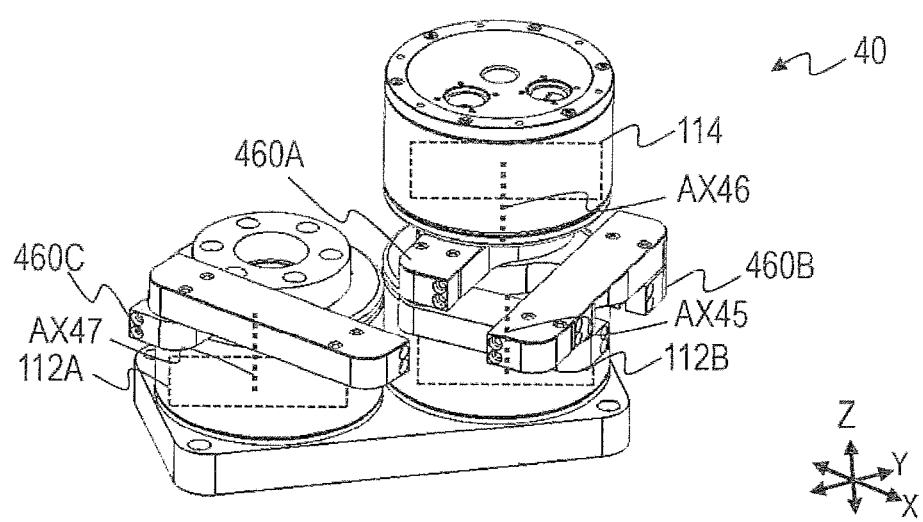
FIG. 19 is a perspective front view of a robotic apparatus according to an embodiment of the present invention.

FIGS. 18 and 19 illustrate the relationship between arm linkage 400 and drive units 112A, 112B, and 114. Drive units 112A and 112E have the same structure the corresponding drive units described above. Drive unit 114 has the same structure as drive units 114A and 114B.

FIG. 18 is a top perspective view of arm linkage 400 of robotic apparatus 40. FIG. 19 is a front perspective view of robotic apparatus 40. As can be seen in FIGS. 18 and 19, first crank arm 460A is pivotal about an axis Ax46 and is brought into pivotal motion by drive unit 114, thus pivoting (rotating) crank arm 160A about axis Ax46 in direction R41. This pivotal motion is converted by joint J41 into translational motion of first arm 412 along direction F41. Second crank arm 460B is pivotal about axis Ax45 and is brought into pivotal motion by drive unit 112B, thus pivoting (rotating) crank arm 160B about axis Ax45 in direction RB42. This pivotal motion is converted by joint J42 into translational motion of second arm 414 along direction F42. As also illustrated in FIGS. 18 and 19, third crank arm 460C is pivotal about an axis Ax47 and is brought into pivotal motion by drive unit 112A. Drive unit 112A causes pivoting (rotating) motion of third crank arm 460C about axis Ax47 in direction RA42. This pivotal motion is converted by joint J43 into translation motion of third arm 416 in direction F43.

In an exemplary embodiment, axes Ax45 and Ax46 are colinear (aligned with each other), as depicted in FIG. 19. Alternatively, axes Ax45 and Ax46 can be offset instead of being colinear.

An operation of robotic apparatus 40 will now be described with reference to FIGS. 20a-20d. FIGS. 20a-20d illustrate control of the arm linkage 400 as performed by control unit 24.

Figure 20A:
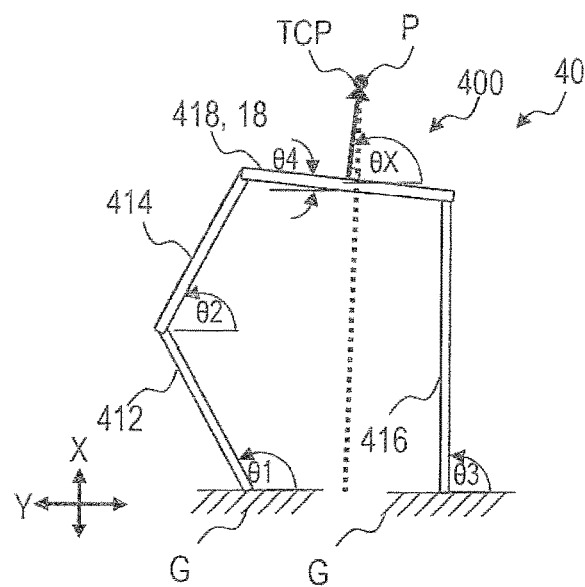
FIGS. 20a-20d are schematic representations of various postures of an arm linkage of a robotic apparatus according to an embodiment of the present invention.
Figure 20B:
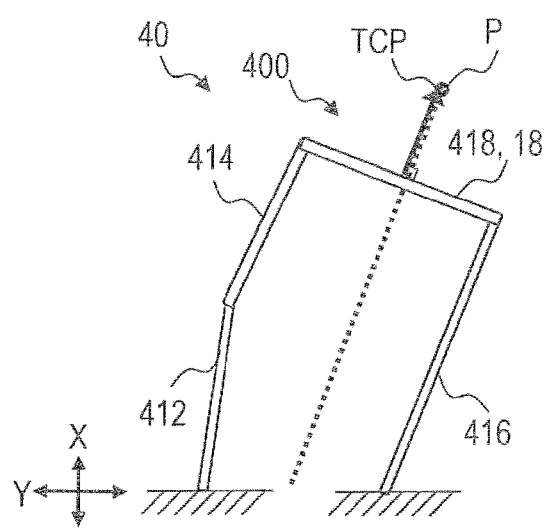
Figure 20C:
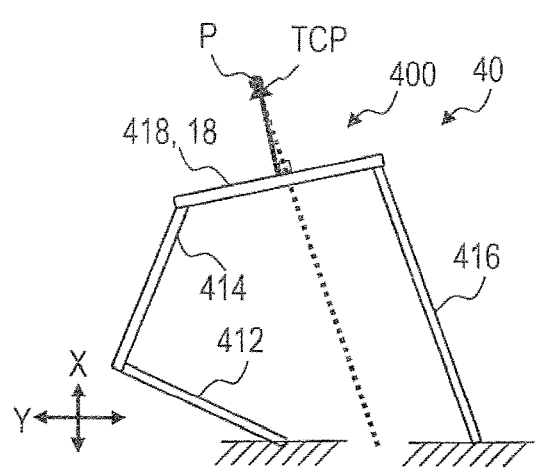
Figure 20D:
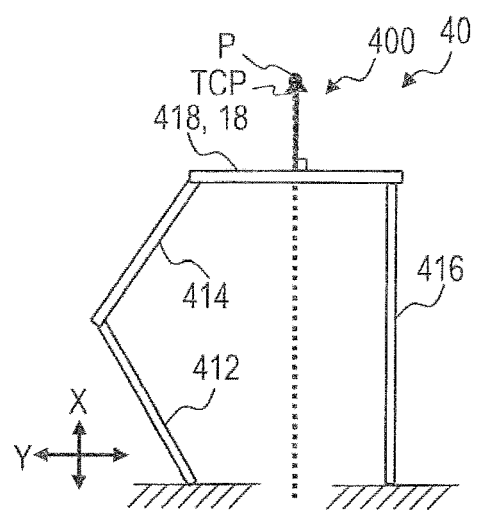

As illustrated in FIG. 20a, arm linkage 400 of robotic apparatus 40 includes four kinematic links and one ground G. First, second, and third arms 412, 414, and 416 each form one of the kinematic links. A fourth kinematic link is formed by carrier unit 18. Control unit 24 is configured to control the orientation of each kinematic link. As illustrated in FIG. 20a, control unit 24 is configured to control an orientation of first arm 412 with respect to horizontal direction Y, as indicated by angle θ1. Similarly, control unit 24 controls the orientation of second arm 414 with respect to the horizontal direction, as indicated by angle θ2. The orientation of the third arm 416 is controlled with respect to the horizontal direction, as represented by angle θ3. Carrier unit 18 is rotatably connected to the distal end portion 414DP of second arm 414 and distal end portion 416DP of third arm 416 and is thereby orientated with respect to the horizontal direction Y by angle θ4. The orientation of carrier unit 18 with respect to horizontal direction Y is represented by angle θX. The values of each of the angles θ1-θ4 and θX, and the location of tool center point TCP are determined from the feedback provided to control unit 24 from each of the drive units 112A, 112B, and 114, for example. Thus, robotic apparatus 40 is controllable in a manner similar to that of robotic apparatus 10 to place tool center point TCP at a desired point P. The control methodology discussed with respect to FIGS. 13 and 14 is also applicable to this control of robotic apparatus 40 and to the control of robotic apparatus 40A.

Figure 21:
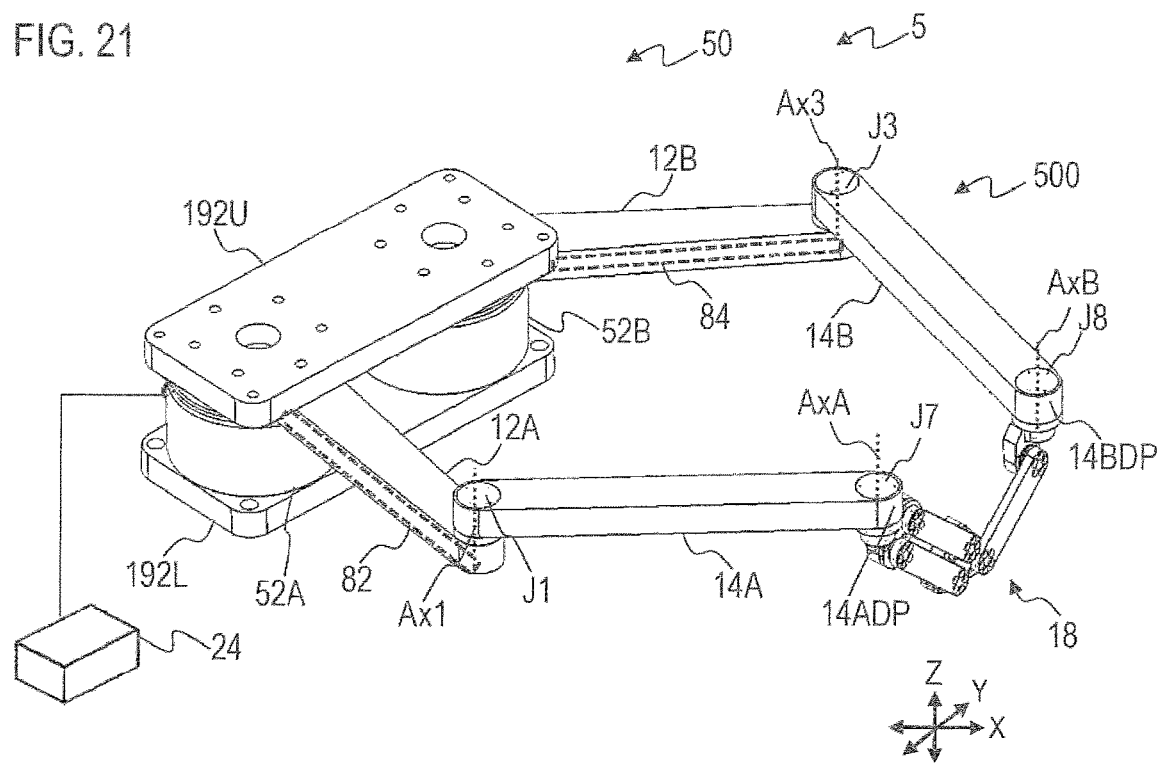
FIG. 21 is a perspective view of a robotic apparatus with belt-driven second and fourth arms according to an embodiment of the present invention.

A robotic handling system 5 including a robotic handling apparatus 50 according to an alternate embodiment will now be described with reference to FIG. 21. Robotic apparatus 50 includes an arm linkage 500 (link mechanism). Robotic apparatus 50, like robotic apparatus 10, includes arms 12A, 12B, 14A, and 14B. First arm 12A includes a belt mechanism 82 that extends from a drive unit to joint J1 to thereby rotate second arm 14A about axis Ax1. Similarly, fourth arm 12B includes a belt mechanism 84 that extends from a drive unit to joint J3 to thereby allow third arm 14B to rotate about axis Ax3. In order to allow first arm 12A to pivot while independently activating belt mechanism 82, two drive units can be provided within housing 52A. Similarly, two drive units, or servomotors, can be provided within housing 52B in order to independently drive fourth arm 12B and activate belt mechanism 84.

The provision of belt mechanisms 82 and 84 allows robotic apparatus 50 to function similar to robotic apparatus 10 without the need of crank arms or carrier arms. Thus, arm linkage 500 of robotic apparatus 50 requires only four arms. Also, by providing two drive units in each of the housings 52A and 52B, a height of robotic apparatus 50 is reduced. Thus, robotic apparatus 50 advantageously reduces the weight and size of the robotic apparatus and robotic handling system.

Figure 22:
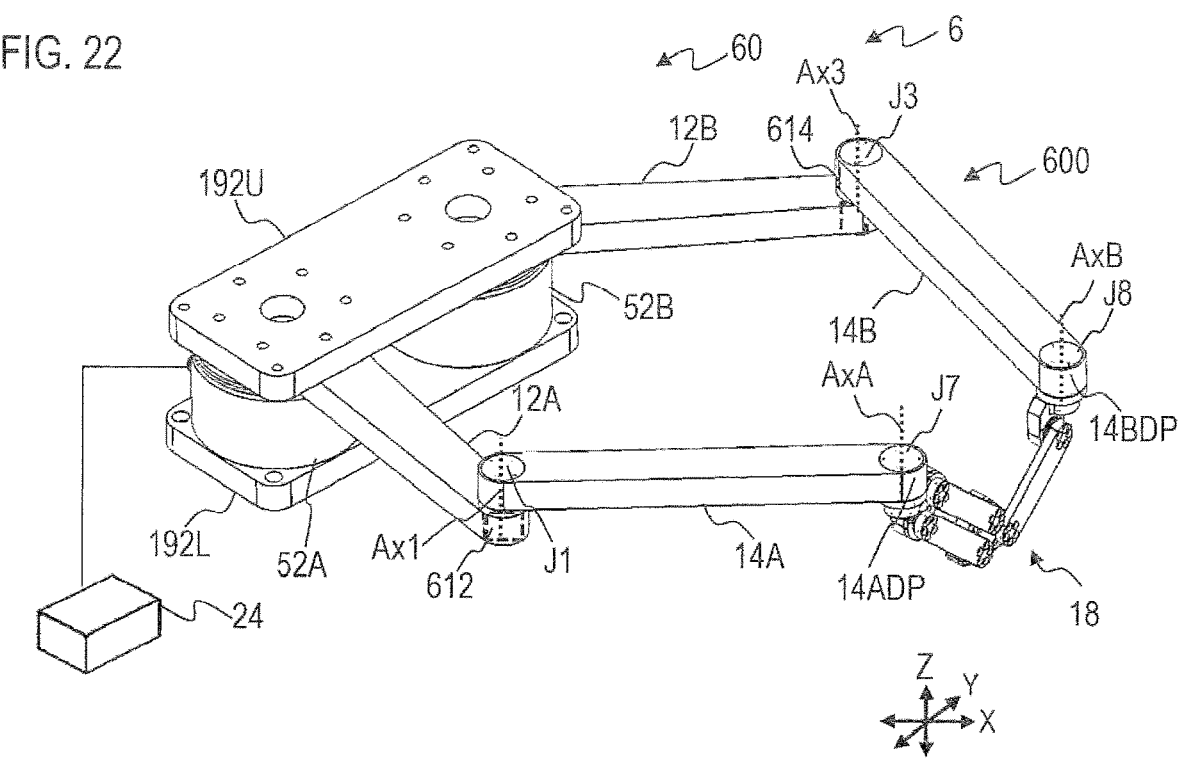
FIG. 22 is a perspective view of a robotic apparatus with directly-driven second and fourth arms according to an embodiment of the present invention.

A robotic handling system 6 including a robotic handling apparatus 60 according to another alternate embodiment will now be described with reference to FIG. 22. Robotic apparatus 60 includes an arm linkage 600 (link mechanism). Like arm linkage 500 of robotic apparatus 50, arm linkage 600 requires only four arms. As illustrated in FIG. 22, a drive unit 612 is provided at a distal end portion of first arm 12A. This drive unit 612 allows second arm 14A to pivot about axis Ax1 via joint J1. A drive unit 614 is disposed within the proximal end portion of fourth ram 12B. Drive unit 614 allows third arm 14B to pivot about axis Ax3 via joint J3. Both drive units 612 and 614 are controlled by control unit 24 and can be comprised of servomotors. Alternatively, drive unit 612 can be provided in the proximal end portion of second arm 14A. Similarly, drive unit 614 can be provided within the proximal end portion of third arm 14B.

Robotic handling system 5 and robotic handling system 6 can include a vertical motion mechanism 30 as illustrated in FIG. 5. By attaching robotic apparatus 50 or robotic apparatus 60 to vertical motion mechanism 30, the robotic apparatus 50 or 60 can be raised and lowered by control unit 24 as discussed with respect to robotic handling system 1. Therefore, while vertical motion mechanism 30 has been described in detail with respect to robotic apparatus 10, each robotic apparatus 40, robotic apparatus 40A, robotic apparatus 50, and robotic apparatus 60 can be included in a robotic handling system with vertical motion mechanism 30.

Advantageously, the robotic system, robotic apparatus, and link mechanism described herein does not require avoidance of a singularity position in which two adjacent links are colinear with each other, thus reducing complexity as compared to conventional linkages.

Advantageously, the robotic system, robotic apparatus, and link mechanism described herein are configured to raise and lower a carrier unit without raising or lower any of the arms of the robotic system, robotic apparatus, or link mechanism. This enables reduced complexity and increased flexibility as compared to conventional linkages. Furthermore, the length, width, and height of the robotic apparatus is significantly reduced, providing a thin and narrow robotic apparatus that is superior when used in narrow workspaces.

What is claimed is:

1. A robotic handling apparatus comprising:
a first arm member configured to pivot about a first pivot axis;
a first drive unit configured to bring the first arm member into motion;
a second arm member configured to pivot about a second pivot axis, the second arm member being connected to the first arm member and having a distal end portion;
a third arm member configured to pivot about a third pivot axis, the third arm member having a distal end portion; and
a carrier unit connected to the distal end portion of the second arm member and the distal end portion of the third arm member to define a distance between the distal end portion of the second arm member and the distal end portion of the third arm member, the carrier unit being a linkage between the second arm member and the third arm member, wherein the distance is changeable in accordance with a movement of at least one of the second arm member and the third arm member, and wherein, while a vertical position of the second arm member and the third arm member is fixed, a vertical displacement of the carrier unit is changeable by changing the distance.

2. The robotic handling apparatus according to claim 1, further comprising:
a first wrist joint that allows the second arm to pivot with respect to the carrier unit when the distance is changed; and
a second wrist joint that allows the third arm to pivot with respect to the carrier unit when the distance is changed, wherein the carrier unit includes a movable link, a movement of the movable link causing a change in the changeable distance.

3. The robotic handling apparatus according to claim 1, further comprising:
a second drive unit configured to bring the second arm member into motion;
a third drive unit configured to bring the third arm member into motion;
a fourth arm member configured to pivot about a fourth pivot axis; and
a fourth drive unit configured to bring the fourth arm member into motion.

4. The robotic handling apparatus according to claim 1, further comprising:
a first wrist joint that allows the second arm to pivot with respect to the carrier unit without changing the distance; and
a second wrist joint that allows the third arm to pivot with respect to the carrier unit without changing the distance.

5. The robotic handling apparatus according to claim 4, wherein the first arm is connected to the second arm by a joint disposed between the first wrist joint and the second pivot axis.

6. The robotic handling apparatus according to claim 1, wherein the carrier unit includes a first carrier link, a second carrier link, and a plate,
wherein the first carrier link is coupled to the second arm member and the second carrier link is coupled to the third arm member, and
wherein the first carrier link and the second carrier link are pivotally coupled to the plate.

7. A robotic handling apparatus comprising:
a first arm member configured to pivot about a first pivot axis;
a first drive unit configured to bring the first arm member into motion;
a second arm member configured to pivot about a second pivot axis, the second arm member being connected to the first arm member and having a distal end portion;
a third arm member configured to pivot about a third pivot axis, the third arm member having a distal end portion; and
a carrier unit connected to the distal end portion of the second arm member and the distal end portion of the third arm member to define a distance between the distal end portion of the second arm member and the distal end portion of the third arm member, wherein a height of the carrier unit is changeable without changing any of:
a height of the first arm member;
a height of the second arm member; and
a height of the third arm member.

8. The robotic handling apparatus according to claim 7,
wherein the distance is changeable in accordance with a movement of at least one of the second arm member and the third arm member, and
wherein the height of the carrier unit is changeable by changing the distance.

9. A link mechanism for a robotic handling apparatus, the link mechanism comprising:
a first arm member configured to pivot about a first pivot axis;
a second arm member configured to pivot about a second pivot axis, the second arm member being connected to the first arm member and having a distal end portion;
a third arm member configured to pivot about a third pivot axis, the third arm member having a distal end portion; and
a carrier unit connected to the distal end portion of the second arm member and the distal end of the third arm member to define a distance between the distal end portion of the second arm member and the distal end portion of the third arm member, the carrier unit being a linkage between the second arm member and the third arm member, wherein the distance is changeable in accordance with a movement of at least one of the second arm member and the third arm member, and wherein, while a vertical position of the second arm member and the third arm member is fixed, a vertical displacement of the carrier unit is changeable by changing the distance.

10. The link mechanism according to claim 9, further comprising:
a first wrist joint that allows the second arm to pivot with respect to the carrier unit when the distance is changed; and
a second wrist joint that allows the third arm to pivot with respect to the carrier unit when the distance is changed, wherein the carrier unit includes a movable link, a movement of the movable link causing a change in the changeable distance.

11. The link mechanism according to claim 9, further comprising:
a first wrist joint that allows the second arm to pivot with respect to the carrier unit without changing the distance; and
a second wrist joint that allows the third arm to pivot with respect to the carrier unit without changing the distance.

12. The link mechanism according to claim 11,
wherein the first arm is connected to the second arm by a joint disposed between the first wrist joint and the second pivot axis.

13. The link mechanism according to claim 9,
wherein the carrier unit includes a first carrier link, a second carrier link, and a plate,
wherein the first carrier link is coupled to the second arm member and the second carrier link is coupled to the third arm member, and
wherein the first carrier link and the second carrier link are pivotally coupled to the plate.

14. A link mechanism for a robotic handling apparatus, the link mechanism comprising:
a first arm member configured to pivot about a first pivot axis;
a second arm member configured to pivot about a second pivot axis, the second arm member being connected to the first arm member and having a distal end portion;
a third arm member configured to pivot about a third pivot axis, the third arm member having a distal end portion; and
a carrier unit connected to the distal end portion of the second arm member and the distal end of the third arm member to define a distance between the distal end portion of the second arm member and the distal end portion of the third arm member,
wherein a height of the carrier unit is changeable without changing any of:
a height of the first arm member;
a height of the second arm member; and
a height of the third arm member.

15. The link mechanism according to claim 14,
wherein the distance is changeable in accordance with a movement of at least one of the second arm member and the third arm member, and
wherein the height of the carrier unit is changeable by changing the distance.

16. A robotic handling system comprising:
a robotic handling apparatus including:
a first arm member configured to pivot about a first pivot axis;
a first drive unit configured to bring the first arm member into motion;
a second arm member configured to pivot about a second pivot axis, the second arm member being connected to the first arm member and having a distal end portion;
a third arm member configured to pivot about a third pivot axis, the third arm member having a distal end portion; and
a carrier unit connected to the distal end portion of the second arm member and the distal end portion of the third arm member to define a distance between the distal end portion of the second arm member and the distal end portion of the third arm member, the carrier unit being a linkage between the second arm member and the third arm member; and
a controller configured to control the robotic handling apparatus and to cause the distance to change,
wherein the distance is changeable in accordance with a movement of at least one of the second arm member and the third arm member, and
wherein, while a vertical position of the second arm member and the third arm member is fixed, a vertical displacement of the carrier unit is changeable by changing the distance.

17. The robotic handling system according to claim 16, further comprising
a vertical motion mechanism configured to raise and lower the first arm member, the second arm member, the third arm member, and the carrier unit as a unit in a height direction.

18. The robotic handling system according to claim 17, wherein the controller includes circuitry configured to control the handling mechanism.

19. The robotic handling system according to claim 16, wherein the carrier unit includes a first carrier link, a second carrier link, and a plate,
wherein the first carrier link is coupled to the second arm member and the second carrier link is coupled to the third arm member, and
wherein the first carrier link and the second carrier link are pivotally coupled to the plate.

20. A robotic handling system comprising:
a robotic handling apparatus including:
a first arm member configured to pivot about a first pivot axis;
a first drive unit configured to bring the first arm member into motion;
a second arm member configured to pivot about a second pivot axis, the second arm member being connected to the first arm member and having a distal end portion;
a third arm member configured to pivot about a third pivot axis, the third arm member having a distal end portion; and
a carrier unit connected to the distal end portion of the second arm member and the distal end portion of the third arm member to define a distance between the distal end portion of the second arm member and the distal end portion of the third arm member; and
a controller configured to control the robotic handling apparatus and to cause the distance to change,
wherein a height of the carrier unit in the height direction is changeable without changing a height of any of: a height of the first arm member, a height of the second arm member, and a height of the third arm member.

* * * * *